(12) United States Patent
Chen et al.

(10) Patent No.: US 12,732,671 B2
(45) Date of Patent: Sep. 8, 2026

(54) METHODS TO IMPROVE BUFFERING AND PRE-BUFFERING OF SHORT FORM VIDEOS

(71) Applicant: Adeia Guides Inc., San Jose, CA (US)

(72) Inventors: Tao Chen, Palo Alto, CA (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 81 days.

(21) Appl. No.: 18/757,978

(22) Filed: Jun. 28, 2024

(65) Prior Publication Data

US 2026/0006297 A1 Jan. 1, 2026

(51) Int. Cl.
*H04N 21/654* (2011.01)
*H04N 21/234* (2011.01)
*H04N 21/466* (2011.01)

(52) U.S. Cl.
CPC ..... *H04N 21/654* (2013.01); *H04N 21/23406* (2013.01); *H04N 21/4668* (2013.01)

(58) Field of Classification Search
CPC ........... H04N 21/654; H04N 21/23406; H04N 21/4668
See application file for complete search history.

(56) References Cited

U.S. PATENT DOCUMENTS 12,301,931 B2 * 5/2025 Karagioules ..... H04N 21/26258
2022/0038761 A1 * 2/2022 Majumdar ......... H04N 21/2343

FOREIGN PATENT DOCUMENTS

CN 118540519 A * 8/2024 ............. G06N 3/092

OTHER PUBLICATIONS

English translation of CN 118540519 A (Year: 2024).*
Liu, Z., et al., "Monolith: Real Time Recommendation System With Collisionless Embedding Table", arXiv:2209.07663, Sep. 27, 2022, 10 pages.
Xie, Y., et al., "Short video preloading via domain knowledge assisted deep reinforcement learning", Digital Communications and Networks, Jan. 26, 2024, 16 pages.
Zhang, G., et al., "Short Video Streaming With Data Wastage Awareness", 2021 IEEE International Conference on Multimedia and Expo (ICME), Jul. 2021, 7 pages.
Zhang, Y., et al., "Measurement of a Large-Scale Short-Video Service Over Mobile and Wireless Networks", IEEE Transactions on Mobile Computing, vol. 22, No. 6, Jun. 1, 2023, pp. 3472-3488.

* cited by examiner

*Primary Examiner* — Gigi L Dubasky
(74) *Attorney, Agent, or Firm* — HG LAW LLP

(57) ABSTRACT

Systems and methods for managing segment buffering in a short-form video application are described. An example method includes identifying a set of recommended content items comprising a first set of segments (which may be "required") and second set of segments (which may be "optional"). The method includes determining a subset of the optional segments by, for each segment: determining a quality level; determining a predicted retention rate; and selecting the segment for the subset based on a comparison of the predicted retention rate to a retention threshold. The method includes determining a modified set of segments, determining a priority level for each segment of the modified set of segments, and prioritizing the transmission of one or more segments to the client device based on the corresponding priority levels.

20 Claims, 11 Drawing Sheets

Playing video:

Buffering current video

Buffered segments

Queued video clips:

Pre-buffering video *q1*

Pre-buffering video *q2*

**Currently playing video *q0***

Queued video clips (e.g.,total 10 clips):

...

...

Pre buffering video *q10*

440

Requested segments and
assigned with normal priority.
for a later clip in the queue.

446

600

Video·segments·to·be·delivered:·not·necessarily·form·a·same·video.·¶

900
Server
904
Control Circuitry
934
Processing Circuitry
936
Communication Circuitry
932
Storage
938
940
930
Communication Network
906
942
928
Computing Device
902
Control Circuitry
908
Communication Circuitry
926
954
924
944
Storage
922
952
920
946
Processing Circuitry
918
948
950
916
Display
910
Input/Output Circuitry
912
914

METHODS TO IMPROVE BUFFERING AND PRE-BUFFERING OF SHORT FORM VIDEOS

FIELD OF DISCLOSURE

The present disclosure relates to managing resources within the context of short video streaming. For example, the present disclosure describes techniques for reducing wastage (e.g., pre-buffering of video segments that end up being discarded without being viewed), as well as improving efficiency with respect to buffer usage and network resource usage.

SUMMARY

Short-form video platforms or applications allow users to watch video clips by scrolling from one clip to the next in a queue of recommended videos. Once a recommendation of a set of videos is made, the videos will be either buffered or pre-buffered at a client-side buffer, depending on whether the video is currently being played or is later in the queue of recommended videos. To help ensure smooth and continuous viewing, segments of videos are pre-buffered at the client-side buffer after the recommendation is made or the queue populated, and before each video clip is played.

Within this context of buffering and pre-buffering video clip segments while numerous videos are swiped through or played in relatively rapid succession, several problems can arise with respect to bandwidth efficiency, buffer usage, and user quality of experience (QoE). In some cases, the issue of re-buffering can arise. Re-buffering refers generally to the delay that occurs when the client or user device attempts to play a video segment that has not yet been completed buffering. If the user device attempts to play a segment of a video that is not completely buffered, the device needs to wait until the segment data is received, which causes a temporary pause of playback on the user device. This can have a significant negative impact on user-perceived quality of the video, as well as the overall experience. Further, the nature of short-form video consumption causes a waste of resources when a pre-buffered video is skipped or swiped through, because the pre-buffered segments of the skipped video are discarded.

Start-up delay is another issue that can arise. Start-up delay refers to the pause between when a user scrolls to a video and when the playback of the video actually begins. For short video applications in which the user frequently scrolls through the video queue, low start-up delay is especially important to ensure high QoE. When an initial set of segments of a video have been buffered, the video can be started instantly without any start-up delay. Furthermore, user behavior can lead to a high rate of re-buffering and/or start-up delay if the segments of videos are not buffered in time or in the proper order. If a user routinely skips from video to video quickly, the system may quickly reach a video in the queue for which there has not been sufficient time to buffer the initial segment(s), resulting in start-up delay and/or re-buffering while the segments are retrieved.

Traditional techniques to address problems like re-buffering and start-up delay involve the system buffering a larger number of segments, so that there is a lower chance that the user device reaches a video or segment that has not been buffered or pre-buffered. However, this results in higher computing resource wastage because a greater number of segments that are pre-buffered never end up actually being presented (e.g., due to scrolling to the next video in the queue, causing buffered or pre-buffered segments from the skipped video to be discarded). Measurements of commercial short-form video streaming platforms have found that nearly 45% of the downloaded video data is eventually discarded. Such a high ratio of data wastage is not desirable, both for users and service providers alike.

Other techniques attempt to reduce computing resource wastage by managing the number and selection of segments to be pre-buffered. Illustrative techniques focus on bitrate alone, or on the global retention rate for each segment (e.g., ignoring the individual user's retention rate). The bitrate of each segment alone, however, does not represent the perceived quality of the segment to a user. Perceived quality is highly content dependent, and the bitrate is generally indicative of quality only when assuming a same content item. For instance, an easy-to-encode video may show a high quality even at 500 kbps while a difficult-to-encode video can present low quality even at 2 Mbps, assuming a same resolution and frame rate. Managing buffering solely based on bitrate can result in low quality video segments being inadvertently pre-buffered at the expense of high quality segments (which are more likely to be viewed by the user), simply because of their corresponding bitrates.

Further, using the global retention rate of a given segment does not adequately reflect an optimization for a specific user, because the user's retention rate and behavior may differ significantly from the wider population. For instance, one user may be receptive to quality 70 (e.g., on a scale of 0-100), and tend to continue watching, while another user may frequently leave videos when viewing a segment of quality 70. Using a single global metric may be inaccurate and may not properly account for the nuanced behavior of the user, thereby leading to a less than optimal solution. Additionally, these techniques do not adequately account for changes in user behavior that cause re-buffering and start-up delay due to the order of segments to be buffered. That is, these techniques do not provide a mechanism for prioritizing the buffering of one or more segments based on the expected time at which the one or more segments are expected to be played vs. expected to be buffered. Thus, there is a need for better management or optimization of bandwidth and buffer usage, in addition to user-specific determinations, within the context of short video streaming.

To help overcome these issues, systems, apparatuses, and methods are provided herein for identifying a selection of segments for a queue of videos to be buffered and/or pre-buffered, as well as determining a priority for each segment, so as to reduce wastage, minimize start-up delay, make efficient use of bandwidth, and make efficient use of buffer and pre-buffer storage at a user device. Techniques described herein may enable the user device to pre-buffer a lower number of segments that are less likely or never actually viewed, thereby reducing wastage. Additionally, techniques described herein may enable higher quality segments to be buffered or pre-buffered, given a higher confidence that these segments will actually be viewed. Further, techniques described herein may enable higher performance with lower bandwidth usage, because wastage is reduced thereby freeing up bandwidth to be used for increase bitrates for other segments that are more likely to be viewed by the user.

Techniques described herein may also enable the user device to prioritize buffering or pre-buffering of segments based on their corresponding priority levels, such that a given segment from one of the videos in the recommended queue that is expected to be played before another segment can be buffered or pre-buffered with a higher priority. That is, certain segments may be assigned a higher priority than others, and may have prioritized delivery to the client device for buffering and playback using a preferred stream such as low latency, low loss, and scalable throughput (L4S) architecture. The streaming of different segments from different video clips within the recommended queue includes a competition for limited bandwidth, making it desirable to identify the importance and priority of each segment so that there is more efficient bandwidth and buffer usages, as well as optimal quality of experience.

In an example, a method includes identifying a set of recommended content items to be presented on a client device associated with a user, each content item of the set of content items comprising one or more segments. The content items may include a currently displayed video, as well as a queue or list of recommended videos. The content items may be determined using any suitable recommendation algorithm, which may also determine an initial first set of segments (also referred to as "required" segment) of the set of recommended content items that should be pre-buffered. The first set of segments or required set of segments may be a default or minimum number of segments of each video in the queue that the recommendation algorithm indicates should be buffered in order to enable each video to begin playing without delay (e.g., segments 0, 1, and 2 of each video). The method may then include determining a second set of segments (also referred to as "optional" segments) of the set of content items. The second set of segments or optional segments may be the next several segments of one or more of the videos that the recommendation algorithm indicates could or should be buffered, but for which buffering may be less important (e.g., segments 3 and 4 of each video). The method may then include determining, from that second set of segments, a subset of segments that should be added or removed from the list of segments to be pre-buffered, thereby improving buffer efficiency, reducing wastage, reducing bandwidth usage, and reducing network congestion.

The subset of the second set of segments or optional segments may be determined by, for each of one or more segments of the second set of segments: (1) determining a quality level of the segment, (2) determining a predicted retention rate for the segment based on the quality level of the segment, and (3) selecting the segment for the subset of the second set of segments based on a comparison of the predicted retention rate for the segment to a retention threshold. That is, the system may analyze one or more of the second set of segments of the recommended content items to determine a predicted likelihood that the segment will actually be viewed by the user, and if the predicted likelihood is low (e.g., below the retention threshold), the segment can be removed from (or simply not added to) the list of segments to be buffered or pre-buffered.

In one embodiment, the list of segments to be buffered or pre-buffered may initially include the first set of segments (e.g., required segments) and the second set of segments (e.g. optional segments), and the methods and systems described herein may include removing one or more segments of the second set of segments from that list. In another embodiment, the list of segments to be buffered or pre-buffered may initially include only the first set of segments. The methods and systems described herein may then include adding one or more segments of the second set of segments to that list. In this manner, the resulting list of segments to be buffered or pre-buffered may be smaller than the initial list provided by the recommendation algorithm, thereby reducing the number of segments that are pre-buffered and reducing wastage.

The method may then include determining a priority level for each remaining segment (e.g., those segments which have a high likelihood of actually being viewed). The method may then include prioritizing the transmission to the client device of one or more segments of the modified set of segments based on the corresponding priority levels of the modified set of segments. That is, certain segments that are marked as high priority may be requested, retrieved, received transmitted, served, and/or buffered before other segments that are not marked as high priority, or are marked as low priority. Then, as the client device presents content items to the user and the user interacts by scrolling from one content item to the next, the system may continually update the analysis described above to determine updated sets of segments, optional segments that can be added or removed, and priorities for the remaining segments.

In some embodiments, the method may further include determining an available bandwidth for the user device, determining the first set of segments (e.g., required segments) based on the available bandwidth, and determining the second set of segments (e.g., optional segments) based on the available bandwidth. Determining the quality level of each segment may include determining a bitrate of the segment based on the available bandwidth, and determining the quality level of the segment based on the bitrate of the segment. In further embodiments, the method may include determining the quality level of the segment based on the bitrate of the segment and a subject matter related to the segment. That is, the content of the segment itself may be used to determine the quality level along with the bitrate.

In some embodiments, the method may include determining the predicted retention rate for the segment based on one or more of (a) a quality level of one or more prior segments of a content item including the segment, (b) the overall retention rate of one or more prior segments of the content item including the segment, or (c) the predicted retention rate for one or more prior segments of the content item including the segment. That is, the method may include looking at a moving window of segments (e.g., the prior three segments), to determine the predicted retention rate for a next segment.

In some embodiments, the method may include accessing a machine learning model to determine the predicted retention rate for a segment. The machine learning model may be trained based on historical user data comprising indications of bitrates of a plurality of historical segments and indications of whether the user has viewed or skipped the plurality of historical segments, among other data specific to the user's viewing habits.

In some embodiments, the method may include determining the predicted retention rate for a segment based on one or more of the segment frame rate, the segment video quality, the segment resolution, or the segment subject matter. In further embodiments, the method may include determining the predicted retention rate for a segment based on a position of the segment within a content item including the segment.

In some embodiments, the method may include recalculating the available bandwidth and making a further determination whether to add or re-add one or more segments of the second set of segments to the list of segments to be buffered or pre-buffered. That is, after determining the modified set of segments (based on the comparison of the retention rate of each segment to the retention threshold), the method may include calculating an updated available bandwidth. The method may then include determining an updated quality level for each segment of the subset of the second set of segments based on the updated available bandwidth, and determining an updated predicted retention rate for each segment of the subset of the second set of segments. The method may then include adding one or more segments of the subset of the second set of segments to the modified set of segments based on the updated predicted retention rates (e.g., if the updated predicted retention rate for a segment indicates it is now above the retention threshold).

In some embodiments, the method may include determining the priority level for each segment of the modified set of segments by, for each segment, determining an expected play time for the segment and determining an expected buffer time for the segment. The expected play time may correspond to an expected time at which the segment will begin to be played. The expected buffer time may correspond to an expected time at which storage of the segment in the buffer of the client device will be complete. The method may then include determining the priority level of the segment based on a comparison of the expected play time and the expected buffer time. If the expected play time is before the expected buffer time, that may indicate a need to prioritize the segment so that the segment is actually buffered first, in order to avoid re-buffering and/or start-up delay.

In some examples, one or both of the expected play time and the expected buffer time for each segment may be determined based on, for that segment, one or more of: (a) a position of the segment within a content item that includes the segment, (b) a number of already buffered segments of the content item that includes the segment, (c) a percentage of the content item that includes the segment that has already been played, (d) a position of the content item including the segment within the set of recommended content items, (e) historical usage data corresponding to the client device, (f) an available bandwidth for the client device, (g) a quality level of the segment, or (h) a bitrate of the segment.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
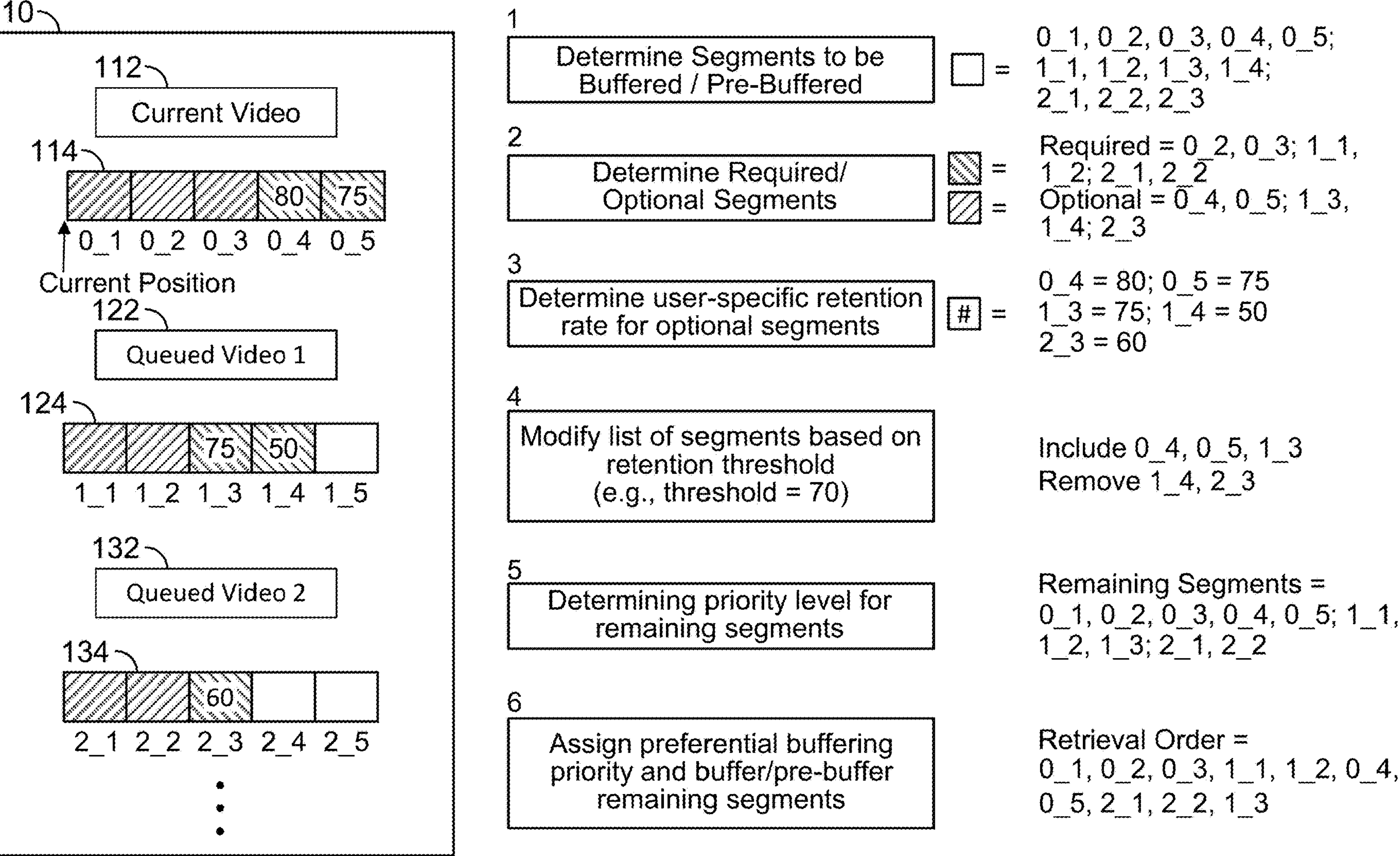
FIG. 1 illustrates a diagram showing an arrangement of segments of content items, and the process for evaluating which segments to buffer or pre-buffer, in accordance with some embodiments of the disclosure.

As noted above, techniques are described herein for managing resources within the context of, for example, adaptive bitrate streaming (ABR) for short video platforms. In many scenarios, a user device or client device buffers or pre-buffers segments of content items that are presented in a queue. The methods, systems, and apparatuses described in this disclosure operate within this context.

At a high level, embodiments within this disclosure can be understood by beginning with a set of recommended content items, which may be determined using any suitable recommendation algorithm or process. Each content item comprises one or more segments, which must be buffered before being presented for consumption. In one example, the initial set of recommended content items corresponds to a recommended or predetermined set of segments that should be pre-buffered by the user device. That is, along with receiving a set of recommended content items (e.g., the next 10 videos in the queue), the client device may also have or be provided instructions regarding which segments of those 10 videos should be pre-buffered. For example, a streaming platform or application may specify a predetermined or default number of segments or minimum number of segments that the client device should pre-buffer for each content item, e.g., the first three segments of each of the 10 content items. The client device may use the techniques disclosed here to determine a modified number of segments, including one or more of the "optional" segments, to pre-buffer for one or more of the 10 content items. This determination of optional segments to pre-buffer may be based on the position of the content item within the queue (e.g., the next two segments of content items 1-5 in the queue may or should be pre-buffered, and the next segment of content items 6-10 may or should be pre-buffered). In other words, the initial recommendation may include not only an identification of the content items that are in the queue, but also the grouping of segments of the recommended content items that are either required to be pre-buffered (e.g., the initial three segments, to enable the content item to being playing), or are recommended to be pre-buffered (e.g., the next segment or two).

Given this framework of recommended content items, as well as required and/or recommended or optional segments to be pre-buffered, embodiments of the present disclosure reevaluate whether each of the segments should actually be pre-buffered, based on various information particular to the segment itself, the content item including the segment, network conditions, the user device (and/or a user profile associated with the user device), and more.

In one embodiment, the system determines the initial first set of segments (e.g., required segments) to be pre-buffered, and then adds one or more of the additional optional segments to the list of segments to be pre-buffered. In another embodiment, the system determines an initial set of segments that includes both the first set of segments (e.g., required segments) and the second set of segments (e.g., optional segments), and then removes one or more of the optional segments based on the analysis of those optional segments. The resulting set of segments to be buffered or pre-buffered may therefore be larger than the initial set (e.g., in the instance where the initial set includes only the required segments), or smaller than the initial set (e.g., in the instance where the initial set includes both the required segments and the optional segments). In either case, the resulting set of segments enables the system to free up bandwidth which may have initially been intended for buffering segments, as well as provide various other benefits (efficiency, buffer usage, etc.).

FIG. 1 shows an example scenario in which a user device 110 running a video application displays a currently playing content item 112. The user device 110 also includes a queue of recommended content items 122 and 132. Additional content items may be included in the queue, but are not shown in FIG. 1 for simplicity. Each content item 112, 122, and 132 has a corresponding set of segments 114, 124, and 134, respectively, that must be stored in a buffer of the user device 110 before they can be presented for display.

Figure 5:
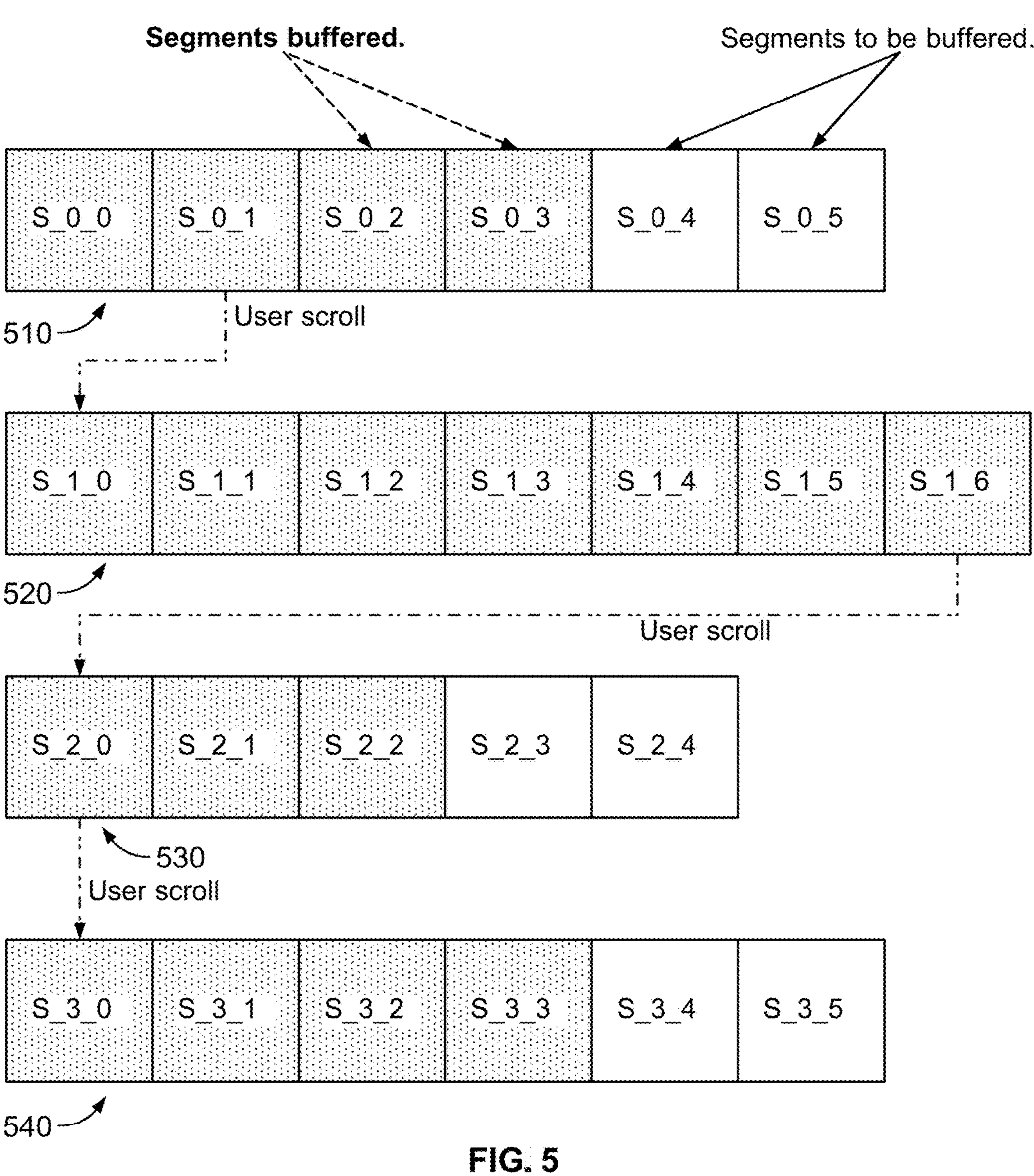
FIG. 5 illustrates a simplified diagram of the segments of a plurality of content items, and how the user may scroll through the content items, in accordance with some examples of the disclosure.

At step 1 in FIG. 1, the video application determines the set of content items and the corresponding plurality of segments that are recommended to be buffered at the user device 110 by the video application (also referred to herein simply as the application). The user device 110 may communicate with a server to receive the list of recommended content items, as well as the list or arrangement of segments of those content items that are recommended for buffering. As shown in FIG. 1, the initial set of segments that are recommended for buffering includes all segments of the currently playing content item 112 (e.g., segments 0_1, 0_2, 0_3, 0_4, and 0_5), the first four segments of content item 122 (e.g., segments 1_1, 1_2, 1_3, and 1_4 the first content item in the queue), and the first three segments of content item 134 (e.g., segments 2_1, 2_2, and 2_3 of the second content item in the queue). As used herein, the notation “X_Y” used to describe a given segment may refer to video X, segment Y, where X is the video position within the queue (e.g., 0 is the currently playing video, 1 is the first video in the queue, etc.), and Y is the segment number for that video, indicating a relative position of the segment. In some cases, the segment number for a video may start at 1 (e.g., as shown in FIG. 1) while in other cases the segment number for a video may start at 0 (e.g., as shown in FIG. 5). It should be understood that the set of recommended content items may include more or fewer content items than are shown in FIG. 1. Additionally, the initial set of recommended segments may be any combination of segments of one or more of the currently playing content item and the queued content items. FIG. 1 illustrates an example set of recommended segments for illustrative purposes only, and it should be understood that other numbers, combinations, and/or arrangements of content items and segments may be used instead (e.g., all segments of the currently playing content item and the queued content items, only the first N segments of the currently playing content item and each of the queued content items, a different number of segments for each content item in the queue, etc.).

At step 2, after the application determines the initial recommendation of recommended segments of the currently playing content item and the queued content items, the application determines which of the recommended segments are required and which are optional. The required segments may be the minimum segments to be buffered for each of the videos in the queue in order to avoid start-up delay (e.g., the delay caused by starting buffering or re-buffering segment(s) of a content item beginning when the application attempts to display the content item). As shown in FIG. 1, the required segments include the first three segments of the currently playing content item 112 (e.g., segments 0_1, 0_2, and 0_3), the first two segments of the first queued content item 122 (e.g., segments 1_1 and 1_2), and the first two segments of the second queued content item 132 (e.g., segments 2_1 and 2_2).

The optional segments are segments that the recommendation algorithm indicates are recommended to be buffered or pre-buffered, but which are not strictly necessary to help avoid start-up delay. The recommendation algorithm may indicate that performance may be improved in one or more respects if these additional optional segments are pre-buffered. However, as indicated elsewhere in this disclosure, pre-buffering a greater number of segments increases the chances of wastage due to an increased likelihood that the additional segments are not actually presented (e.g., such as when the user skips to a second content item before reaching a pre-buffered optional segment of a first content item). In FIG. 1, the optional segments include segments 0_4 and 0_5 of the currently playing content item 112, segments 1_3 and 1_4 of the first queued content item 122, and segment 2_3 of the second queued content item 132.

At step 3, the application may determine the user-specific retention rate for each of the optional segments. The user-specific retention rate may reflect a prediction of the likelihood that the user of the user device will continue watching a given segment before skipping to the next content item. To make the determination, the application may consider information such as the global retention rate for each segment of one or more content items (e.g., the retention rate for one or more segments across a large number of users), the quality level of each segment (e.g., determined based on the bitrate and/or other information regarding the segment), and historic user-specific retention rates for a given quality level of segment (e.g., the historic retention rate for the user of other segments having the same quality level). This determination is described in further detail below, particularly with respect to FIGS. 2 and 3. The application determines a retention rate for each quality level of segment, wherein the retention rate is specific to the user of the user device 110 (and/or a user profile associated with the user device). Using this information, the application can then determine a user-specific retention rate for each optional segment (e.g., based on the quality level of the optional segment), which indicates a likelihood that the user will continue to watch that segment. As shown in FIG. 1, the application determines that the user-specific retention rates for the optional segments are: 0_4=80, 0_5=75, 1_3=75, 1_4=50, and 2_3=60. The range of possible retention rates may be on a scale of 0-100 (e.g., reflecting a predicted percentage chance that the user continues to watch a given segment), or may use some other range, scale, or unit of measurement.

At step 4, the application modifies the list of segments to be buffered by adding or removing one or more optional segments based on the determination at step 3. In one embodiment, the application may start with a list of segments including only the required segments (or first set of segments), and may then add to that list each of the optional segments (e.g., second set of segments) that has a corresponding user-specific retention rate that is above a retention threshold. That is, the application may start with a default assumption that all of the optional segments should not be buffered, and only if a given optional segment has a user-specific retention rate that is above a threshold (e.g., a threshold of 70), the application adds that optional segment to the list of segments to be buffered.

In another embodiment, the application may start with a list of the required segments (e.g., first set of segments) and the optional segments (e.g., second set of segments), and may then remove from that list each of the optional segments that has a corresponding user-specific retention rate that is below the retention threshold. That is, the application may start with a default assumption that all of the optional segments should be buffered, and only if a given optional segment has a user-specific retention rate that is below a threshold (e.g., a threshold of 70), the application removes that optional segment from the list of segments to be buffered. In either case, the application determines the list of segments to be buffered, which may include only the required segments, or may include both the required segments and one more optional segments. In FIG. 1, this list includes segments 0_1, 0_2, 0_3, 0_4, 0_5, 1_1, 1_2, 1_3, 2_1, and 2_2 (e.g., but not including segments 1_4 and 2_3). In the first embodiment wherein optional segments are added to the list, this list reflects that optional segments 0_4, 0_5, and 1_3 have been added to the list. In the second embodiment wherein optional segments are removed from the list, this list reflects that optional segments 1_4 and 2_3 have been removed from the list.

In yet other embodiments, the application may evaluate one or more of the "required" or default segments (e.g., first set of segments) to add or remove from the list of segments to be buffered. That is, the analysis described herein with respect to one or more of the optional segments may be performed with respect to the required segments as well. The application may thereby determine whether one or more of the required segments should actually be buffered, or whether they can be removed or not added to the list of segments to be buffered.

At step 5, the application determines a priority level for each remaining segment on the list (e.g., one or more of the required segments, all of the required segments, and/or, both the required segments and the one or more remaining optional segments). In one example, this includes the application determining an expected play time and an expected buffer time for each segment on the list. The expected play time may refer to the expected future time at which the segment is predicted to begin being played or presented by the user device. The expected buffer time may refer to the time at which the segment is expected to be completely buffered by the user device. This process is discussed in further detail below with respect to FIGS. 5-7.

At step 6, the application assigns preferential buffering priority to the remaining segments in the list based on the determined priority levels. For a given segment, if the expected play time is earlier than the expected buffer time (e.g., the application predicts that the user will scroll to the video and reach the segment before that segment has finished buffering), the application may assign a preferential buffering priority to that segment, such as by applying low latency, low loss, and scalable throughput (L4S) techniques or some other protocol to prioritize or preferentially treat the transmission and processing of the segments. Assigning the preferential buffering priority to the segment may enable the application to retrieve and complete buffering of that segment earlier, such that a new expected buffer time for the segment after the preferential buffering priority has been applied occurs before the expected play time. This process can thereby improve performance by reducing re-buffering. The application may then retrieve the segments based on the corresponding priorities of the segments, and may display the retrieved segments to user.

Figure 2:
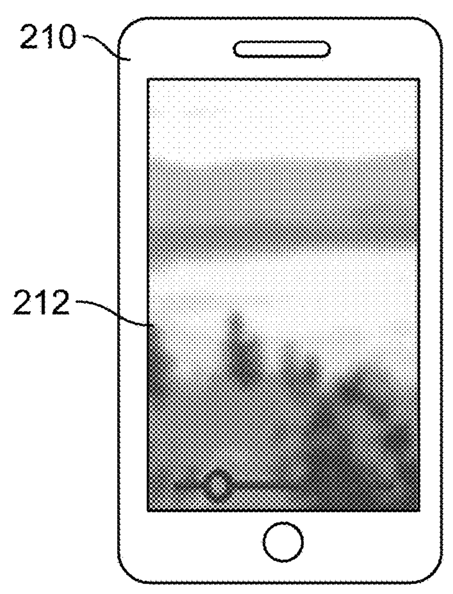
FIG. 2 illustrates another example diagram showing a currently playing content item and two queued content items, along with respective buffer representations, in accordance with some examples of the disclosure.
Figure 2:
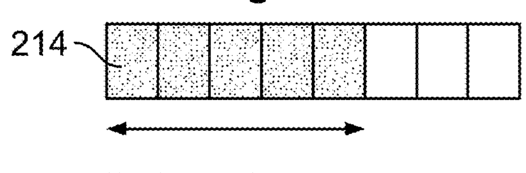
Figure 2:
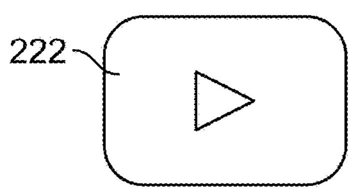
Figure 2:
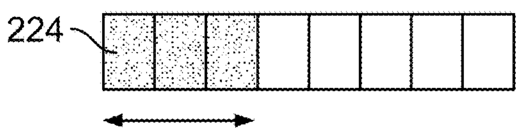
Figure 2:
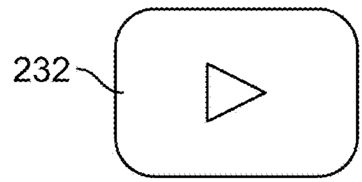
Figure 2:
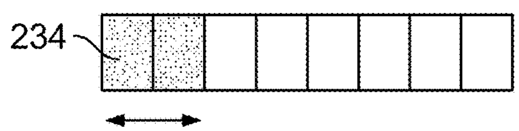

FIG. 2 illustrates an example simplified block diagram of a user device 210 with a current content item 212 and a queue of recommended content items 222 and 232. Content items, such as items 212, 222, and 232, may be buffered or pre-buffered at a client-side buffer of the user device 210. In this disclosure, the terms buffer and pre-buffer may be used interchangeably to refer to the retrieval of a segment from a server and storage of the segment in a buffer of the user device 210. FIG. 2 illustrates simplified representations of the buffer for each content item, shown as buffers 214, 224, and 234 respectively. It should be appreciated that the user device 210 may include a single buffer, storage, or memory that stores segments from all of the content items. The user device may partition or segment the buffer for each content item (e.g., such that segments of each content item are grouped together in the buffer). In other embodiments, the user device may include separate buffers for each content item, and/or any combination of separate or combined buffers.

The buffers 214, 224, and 234 illustrate a series of segments of each content item 212, 222, and 232, showing which segments of the content items have already been retrieved and stored in the buffer of the user device 210, and which segments have not yet been retrieved and stored. In some embodiments, the currently playing content item 212 may have the largest number of segments buffered, and content items in the recommended queue may have the same or different numbers of segments stored in the buffer.

As noted above, it may be desirable to (1) reduce and/or eliminate start-up delay caused by the user device attempting to begin play of a content item without the initial segment(s) of the content item stored in the buffer, as well as (2) reduce and/or eliminate wastage caused by retrieval and storage of segments that never end up being viewed. Proposed methods and systems described herein can be integrated with existing pre-buffering methods to achieve a balance between minimizing bandwidth wastage and start-up delay, and maximizing Quality of Experience (QoE) for users. Method and systems described herein may also ensure efficient use of buffers for each user device, as well as efficient network resource usage across multiple user devices and content item providers. Methods and systems described herein may involve a multi-step process that dynamically adjusts the number and quality of pre-buffered segments based on current network conditions, segment data, user behavior, and segment content.

As noted above, a first step includes the application determining or receiving an initial pre-buffering decision. The initial pre-buffering decision may include using an existing pre-buffering optimization method to determine the initial set of recommended content items as well as the number and arrangement of segments to be pre-buffered for that set of content items. In some embodiments, the initial number of content items may be five, ten, or any other suitable number of recommended content items. Further, the number and arrangement of segments of the initial set of content items may include any suitable number and arrangement of segments of the initial set of recommended content items. This step establishes a baseline for how many segments of each content item should be buffered in advance to maintain smooth playback without interruption (e.g., without start-up delay or re-buffering). The arrangement of segments that are recommended to be buffered for the recommended content items may depend on the position of each content item within the queue. That is, the first content item in the queue may have a larger number of recommended segments, while the last content item in the queue may have a smaller number or no recommended segments at all. Further, as noted above with respect to FIG. 1, the recommended segments may include a first set of segments (e.g., required segments), and a second set of segments (e.g., optional segments) which may have a smaller impact on start-up delay and/or re-buffering. In one example, each content item in the queue may have the first three segments indicated as required, while the number of optional segments depends on the positioning of the content item within the queue. The first content item in the queue may have an additional two optional segments, while the last content item in the queue has no additional optional segments.

After determining the initial set of recommended content items and recommended segments for buffering, the application may include determining the bitrate for each segment based on an available bandwidth. The application may assess the current network bandwidth available to the user device 210, and may decide the appropriate bitrate for each segment that is to be buffered (e.g., the required and optional segments). This may include applying any suitable laddered bitrate assignment such that each segment may have different bitrate or quality. This step helps ensure that the selected bitrate for each segment matches the network conditions, optimizing for both playback quality and efficiency in data usage. The application may determine the bitrate for one or more segments based on the available bandwidth of the user device 210, network conditions (e.g., congestion, other connected devices, bandwidth caps, device limitations, user settings, etc.), available playback quality of the segment, data usage, and more. In some embodiments, each segment may have the same bitrate, or two or more segments may have different bitrates for different segments. Network conditions, bandwidth availability, and various other factors used to determine the appropriate bitrate for the segments may change over time. The application may make an initial bitrate determination for the segments at a first point in time, and may update or change that determination for one or more segments as additional information is gathered, as network conditions change, and/or as one or more other factors used in the determination of the segment bitrates change.

After the initial bitrate determination is made, the application determines whether each segment should actually be buffered, or whether one or more segments may be left off or removed from the list of segments to be buffered. As noted above, in one embodiment the initial set of segments may include only required segments, and the application may determine whether to add one or more of the optional segments to the list. In another embodiment, the initial set of segments may include both the required segments and the optional segments, and the application may determine whether to remove one or more of the optional segments from the list. Furthermore, in another embodiment the application may determine whether to add or remove on or more of the required segments from the list. In each case, the application may analyze one or more of the required segments or optional segments to determine whether they should be included in the list of segments to be buffered.

To evaluate each segment, the application may consider various information such as (1) the segment based quality per bitrate (e.g., the quality of each segment based on the corresponding bitrate), (2) the global retention rate for the segment at the given bitrate, and (3) the predicted user-specific retention rate for the segment.

The segment-based quality per bitrate measures the quality of the segment. This quality measurement may vary from segment to segment within a content item, or may simply be inherited from the quality measurement of the content item itself. In some embodiments, an existing algorithm or quality measurement may be used, and the quality measurement may refer to a perceived quality by a user, or a picture quality measurement. The segment-based quality measurement may be used in other steps described herein to determine the user-specific retention rate or likelihood that the user will continue playback of the content item without scrolling to the next video. For a same content item or segment, a higher quality may correspond to a higher probability of the user remaining on the content item when playing the segment. In some embodiments, the quality measurement may be obtained during video compression. Quality may be highly dependent on the content of the segment or content item itself. That is, if the content or subject matter of a given segment is relatively simple (e.g., a solid color background), the perceived quality will be higher, even at a low bit rate. Similarly, if the content or subject matter of a given segment is relatively complex (e.g., a busy nature scene with a lot of moving parts), the perceived quality may be low even at a high bit rate. In some examples, the application may determine the quality of a segment based on the known bitrate of the segment. The bitrate of the segment may correlate with the quality, but may not be a perfect representation of quality (i.e., the bitrate may not be a perfect substitute for the quality measurement). The quality measurement may be determined for each required segment, as well as for each optional segment in the initial set of segments.

The application may also determine the global retention rate for each segment, including both the required segments and the optional segments. For each content item, there may be multiple bitrates encoded for streaming. For example, the content item server may include versions of one or more segments at 500 kbps, 1 Mbps, 2 Mbps, etc. The global retention rate may be determined based on data collected over a large number of users and a large number of content items. The global retention rate may reflect the probability that a generic user will continue to finish a particular segment at a particular bitrate. For example, a 75% retention rate for a segment may indicate that 75% of overall users will not leave the content item that includes the segment when the segment is being presented by the user device. In another example, the global retention rate may reflect the proportion of overall users who, when presented with the segment, continued watching all the way until that segment was completed. In another example, the global retention rate may instead reflect the proportion of overall users who watched a given segment after it was pre-buffered (e.g., the proportion of users for whom the segment did not become "wastage"). In some examples, the global retention rate is associated with each segment at each specific bitrate. That is, for the same video, the global retention rate may differ based on whether the segment is provided as a first bitrate vs. being provided at a second bitrate.

The predicted user-specific retention rate refers to a prediction of how likely the user is to actually view the segment, or how likely the user device is to actually need the segment at some point (e.g., that the segment will not become wastage). Each individual user's response to a same segment (at the same bitrate) may vary greatly. Each user has personal and subjective experience when viewing the same segment, depending on multiple aspects including quality, start-up delay, re-buffering, etc. To simplify, embodiments of the present disclosure consider the user-specific retention rate of a segment based on the quality of the segment, and without direct consideration of the content or subject matter of the segment. This calculation may be indicative of the probability of the user continuing to watch a segment when it is presented. For instance, a user may exhibit a retention rate of 80% for segments of quality 90, and a retention rate of 70% for segments of quality 80. In another example, the user may continue to complete watching of content items when segments are consistently delivered at quality 80, while another user may quickly switch to the next content item if the segment quality drops below quality 80, but continues to view content items when segments are presented consistently with quality 85. Because each user's behavior with respect to segment quality may differ, it may be used to influence the pre-buffering decisions (e.g., how many and which segments to pre-buffer for a given content item). In some embodiments, the user-specific retention rate may be determined in the range from 0 (lowest) to 100 (highest), or may use some other value, range, or unit of measurement. The user-specific retention rate may be determined based on user data collected for a period of time for the user across a large number of content items and segments. In some examples, the user-specific retention rate may be determined independently from the content or subject matter of the segment or content item including the segment itself. In other examples, the content or subject matter of the segment or content item may be used in making the determination of the user-specific retention rate.

Using the factors described above, including (1) the segment-based quality per bitrate, (2) the global retention rate for the segment at the given bitrate, and (3) the predicted user-specific retention rate for the segment, the application may determine for each segment whether or not it should be buffered. This determination may be made at a point in time at which the data of a given segment (e.g., the bitrate, quality level, etc.) become more deterministic with respect to predicted user retention rate. At this point, the application can make a better determination of whether to buffer the segment or not, and thereby improve network and buffer efficiency. The decision process may rely on the statistics of the segments as well as the user's expected response to watching those segments. If the application determines that the user is likely to continue watching the content item after finishing all the currently buffered segments (e.g., segments S1-S3), the buffering should continue with requesting segment S4. If the application determines that the user is likely to leave the content item after or during play any of the initial segments (e.g., segments S1-S3), the application may determine not to request buffering of the next segment S4.

Figure 3:
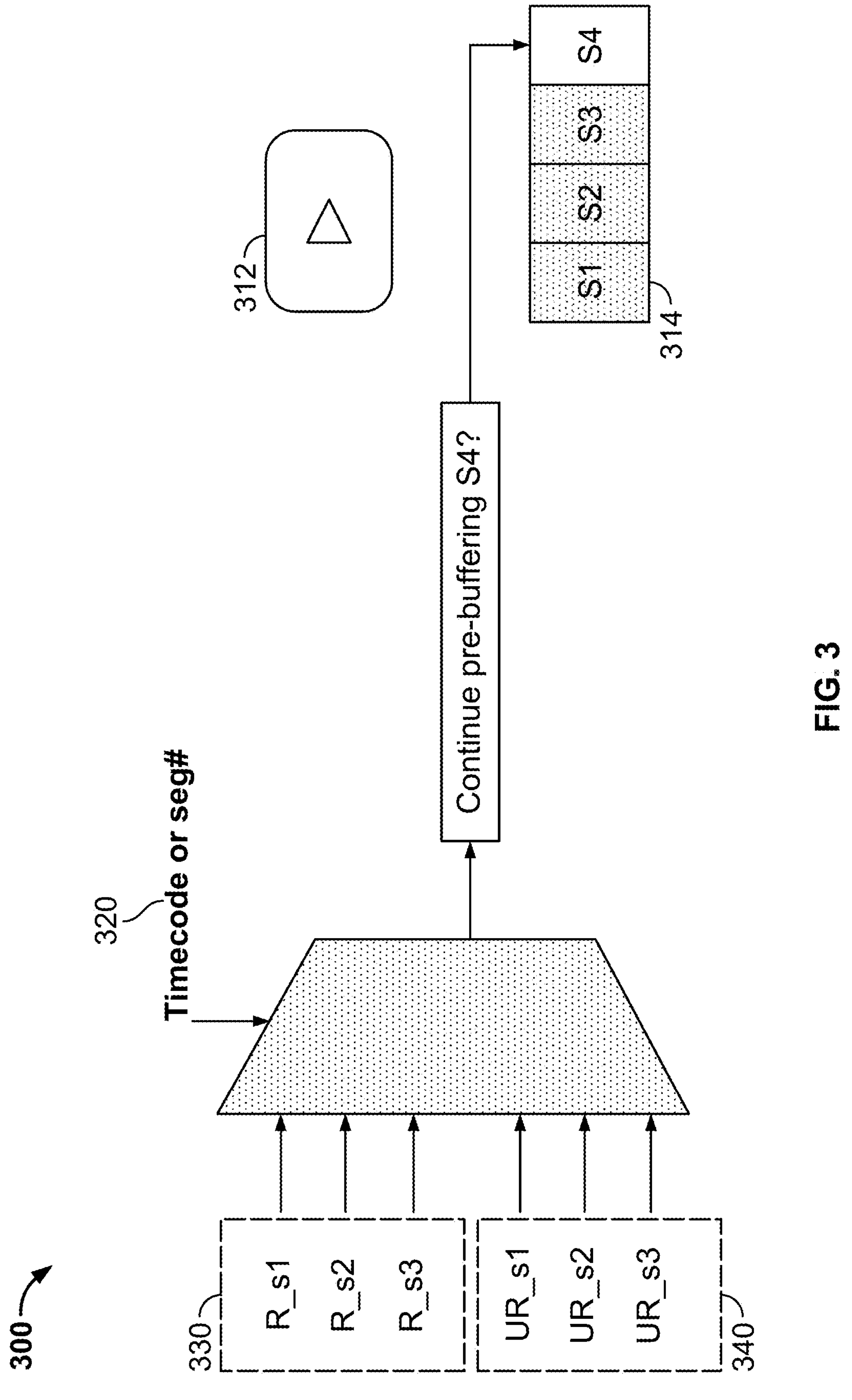
FIG. 3 illustrates an example technique for evaluating whether a next segment should be buffered or pre-buffered, in accordance with some examples of the disclosure.

FIG. 3 illustrates an example mechanism for determining whether to store a given optional segment (e.g., segment S4) in the buffer 314 based on information relating to the segment S4 as well as one or more prior segments in the content item 312 that includes segment S4. The illustrated embodiment of FIG. 4 may represent a simplified machine learning model 300 that is configured to output a determination of whether to buffer a given segment (e.g., segment S4) based on information corresponding to the prior segment (s) of the content item including that given segment. For example, the machine learning model may consider the global retention rates for the prior segments S1, S2, and S3, reflected in FIG. 3 as inputs 330 (e.g., R_s1, R_s2, and R_s3. These global retention rates may already incorporate the known quality of the segments, because the global retention rates for segments S1, S2, and S3 may be determined for each segment at the corresponding quality level or bitrate. The machine learning model 300 may also consider the user-specific retention rates for the prior segments S1, S2, and S3, reflected as inputs 340 (e.g., UR_s1, UR_s2, and UR_s3). These user-specific retention rates may already incorporate the known quality of the segments, because the user-specific retention rates for segments S1, S2, and S3 may be determined for each segment at the corresponding quality level or bitrate. The machine learning model 300 may include other information as inputs as well, such as information specific to the next segment for which the determination is being made (e.g., segment S4), information specific to the content item as a whole, user specific information (e.g., minimum retention rate, maximum retention rate, mean retention rate, etc.), and more.

The machine learning model 300 may be trained using the user's session and historical data. For example, the user's actions with respect to a plurality of segments and a plurality of content items over time (e.g., completing viewing of the segment, skipping to a next segment in the content item, skipping to a next content item, exiting the application, etc.) may be used to train the machine learning model 300. Other additional parameters can be specified as well, such as bandwidth, bitrate, time of the day, the subject matter or content of the segment itself, and more. The machine learning model may be trained by iterating and evolving continuously. The training can take place as a background process, through operations on a cloud server, or collectively by both. Reinforcement learning can be used as the user's feedback may be an important part of the prediction.

With respect to FIG. 3, the output decision of whether to buffer segment S4 is shown as being dependent on the information regarding the prior three segments, S1, S2, and S3. It should be appreciated that other amounts of prior segments may be used in making this prediction as well. The number of prior segments used in the determination may depend on various factors, including the quality of the segments, the bitrate of the segments, the position of the content item including the segments within the queue, and more. Further, the machine learning model 300 may incorporate a sliding window that covers a number of prior segments. After a determination is made for segment S4, the machine learning model may continue the process to make a determination with respect to segment S5, S6, etc., as well as to make respective determination for each other segment of each other content item in the queue. In some embodiments, the application may set a maximum number of segments that should be buffered or pre-buffered. Thus, although the machine learning model 300 may determine that the application should continue to buffer additional segments (e.g., the likelihood of the user viewing additional segments is high), the application may refrain from pre-buffering one or more segments if the maximum limit is reached.

In some embodiments, the machine learning model 300 may also consider the timestamp or segment number 320 within the overall content item, as shown in FIG. 3. This information may be useful for recognizing patterns in user engagement that vary with time. For example, a user may be more likely to skip the initial segment(s) of a content item, but may be more engaged in the middle or towards the end of a content item. Thus, the timestamp or segment number

320 may be used in the pre-buffering decision by the machine learning model, either as a feature for the input, or inherently as used in a sequence model, like RNN (recurrent neural network), LSTM (long short-term memory), or GRU (gated recurrent unit). RNNs may be particularly suited for this task due to their ability to process sequences of data, making them useful for incorporating temporal context like segment number or timestamps into the decision-making process. Using RNN, decisions may be made one by one for each segment starting from the minimum number of required segments for a content item (e.g., three). In an embodiment where the timestamp or segment number is used as an input feature, this information may be directly plugged in the machine learning model with the training data collected, including the segment number to be inferred.

As noted above, the determination of whether a given optional segment should be pre-buffered may be made depending on the user-specific retention rate of the segment itself, and comparing that rate to a threshold. For example, if the user-specific retention rate of a segment (e.g., 80) is greater than the threshold rate (e.g. 75), then the segment should be pre-buffered. The retention threshold may be static, or may be dynamic and change over time. For example, the threshold may correspond to or correlate with some other indicator such as segment quality, bitrate, segment position within a content item, content item position within the queue, and more. Also, as noted above, the determination of whether to pre-buffer a given segment may be made using a machine learning model, such as model 300 in FIG. 3. In either case, once the determination is made for each optional segment, the application may modify the set of segments to be pre-buffered. In one embodiment, this may include adding one or more of the segments to the list of segments to be pre-buffered. In another embodiment, this may include removing one or more segments from the list of segments to be pre-buffered.

After modifying the list of segments to be pre-buffered, the application may retrieve those segments. Alternatively, because the updated list of segments may be less than the initial set of recommended segments, there may be additional unaccounted for bandwidth that is now available. The application may use this freed-up bandwidth to accommodate higher quality level segments. For example, after removing one or more optional segments (or not adding one or more optional segments) from the list of segments to be pre-buffered, the application may recalculate the available bandwidth based on the modified set of segments. The application may reallocate the bandwidth and determine updated segment bitrates for one or more of the optional segments. The updated bitrate for the one or more optional segments may result in a higher quality level for those one or more segments. The application may then use the updated segment bitrates to determine updated quality levels, which may then be used to make an updated determination of whether to add or remove the segment from the list of segments to be pre-buffered. In some cases, this may include adding an optional segment back onto the list based on its updated quality level (and corresponding updated predicted user-specific retention rate), even if the same segment was removed from the list due to its initial quality level (and corresponding initial predicted user-specific retention rate). As a result, the application may arrive at an optimal arrangement of segments and quality levels that cause an improvement in user QoE without increasing bandwidth usage. The application may maintain efficient bandwidth usage and buffer usage while providing higher quality segments to the user.

Once the application determines the set of segments to be pre-buffered, the application may evaluate each segment to determine a corresponding priority level. Since short form video streaming exhibits unique content statistics and user behaviors, it may be desirable to assess parameters of the segments besides the fragment size to determine the order with which the segments should be retrieved and buffered at the user device. The consideration of various priority parameters can be used to optimize the streaming of those segments so that an improved QoE is achieved in terms of minimizing start-up delay, minimizing playback stall, making efficient use of network resources, etc.

Determining a relative priority for each segment enables certain segments to be prioritized and/or retrieved before others. This may be done by assigning a preferential buffering priority to one or more segments (e.g., using L4S), which allows the application to put those segments ahead in the line or order of segments to be transmitted or retrieved, processed, and stored in the user device buffer.

Figure 4:
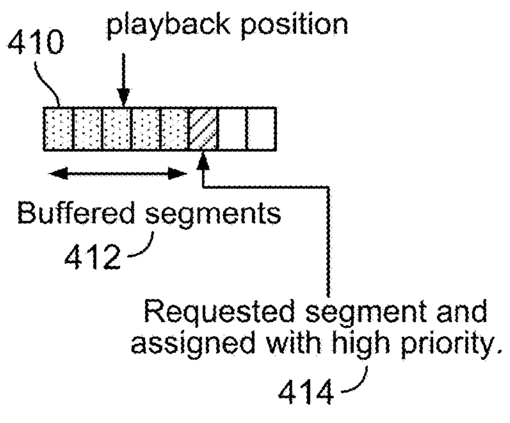
FIG. 4 illustrates an example diagram showing a currently playing content item, a plurality of queued content items, and how segment buffering priorities can be arranged based on the position of the content items within the queue, in accordance with some examples of the disclosure.
Figure 4:
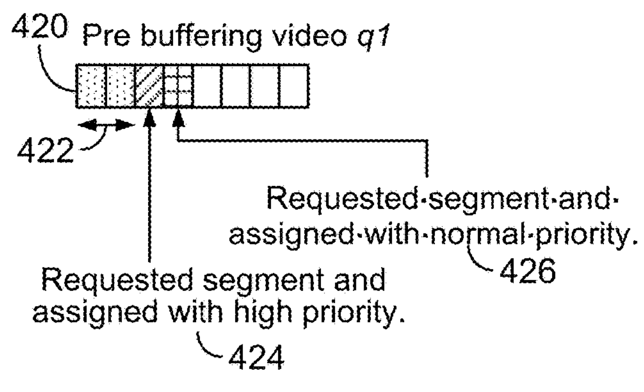
Figure 4:
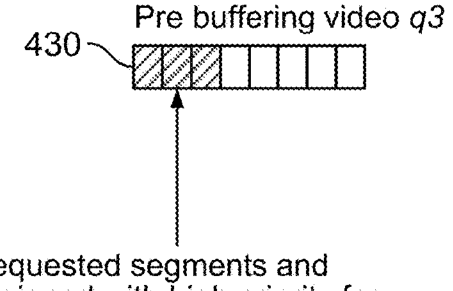

FIG. 4 illustrates an example simplified block diagram showing how segment priority can manifest in the segments of content items in a queue. FIG. 4 illustrates the buffer of a user device for a currently playing content item 410, and the respective buffers for a plurality of content items in a queue 420, 430, and 440. In this scenario, segments 412 of content item 410 have already been buffered, and segment 414 has been requested with high priority. Segments 422 of content item 420 have already been buffered, segment 424 has been requested with high priority, and segment 426 has been requested with normal priority. Segments 424 of content item 430 have been requested with high priority, and segments 446 of content item 440 have been requested with normal priority. Segments of the currently playing content item 410 may be given high priority (e.g., segment 414, given the likelihood that these segments will be needed shortly), some segments of content items high in the queue may be given a high priority (e.g., segments 424 and 434 of content items 420 and 430, given the likelihood that these segments will also be needed shortly), and segments of content items low in the queue may be given a low or normal priority (e.g., segments 446 of content item 440, given the low likelihood that these segments will be needed shortly). Additionally, later segments in content items that are high in the queue may be given normal priority as well (e.g., segment 426 of content item 420, given the low likelihood that this segment will be needed shortly).

FIG. 4 illustrates one example arrangement of priorities for various segments. As discussed in more detail below, the determination of priority for a given segment may be made based on the expected buffer time and the expected play time for the segment. Additionally, the application may consider other information such as the probability of the user completing the current video, the percentage of the current video being played, the number of segments of the current video in the buffer, the bitrate of the segments (or video quality), the bandwidth budget for the segment, etc. A higher bitrate segment may be given a high priority, assuming other conditions are approximately same. For instance, the bitrate for which a given segment is requested may affect the expected buffer time, which may then result in a need to prioritize buffering of that segment using a technique such as L4S, if the segment is requested at a high bitrate. Factors that the application may consider in determining the priority level for each segment can include, as a non-exhaustive list: (1) the probability of the user completing the segment, (2) the probability of the user completing the content item, (3) the number or percentage of segments of the content item including the segment that are already buffered, (4) the number or percentage of remaining segments in the content item after the segment, (5) the number or percentage of segments of the currently playing content item that have been played, (6) the number or percentage of remaining segments of the currently playing content item, (7) the position of the segment within the content item (e.g., first segment, last segment, etc.), (8) the position of the content item including the segment within the queue, (9) the bitrate of the segment, (10) the quality of the segment, (11), the available bandwidth, and (12) user behavior or user-specific data with respect to the segment (e.g., predicted user-specific retention rate). The user behavior may also include various information collected over time, such as how often the user scrolls from content item to content item, how likely the user is to watch the end of the segment or content item, expected user behavior with respect to time of day, day of the week, etc., and more.

In some embodiments, the application may determine the priority level for each segment based on an expected buffer time of the segment and an expected play time of the segment. The expected buffer time and the expected play time may be determined based on one or more of the factors noted above. Based on a comparison between the expected buffer time and the expected play time for a given segment, the application can determine whether to prioritize the segment and move it ahead in the line of segments to be retrieved and stored in the buffer. The application can therefore apply a preferential buffering priority (e.g., L4S) to prioritize early buffering of that segment. As a result of the preferential buffering priority, the expected buffer time for the segment can be moved sooner than the expected play time, so the application does not have to wait for the segment to be buffered when the expected play time arrives.

Figure 6:
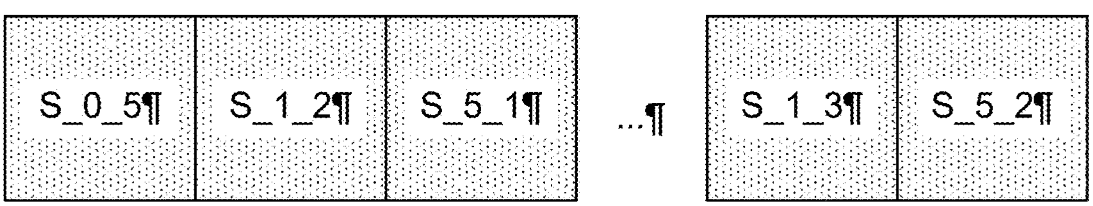
FIG. 6 illustrates an example sequence of segments to be buffered, in accordance with some embodiments of this disclosure.

FIGS. 5 and 6 illustrate example sequences of segments and content items according to embodiments of the present disclosure. FIG. 5 illustrates a queue of content items 510, 520, 530, and 540, and shows the progression of segments that are presented via the user device as the user scrolls from content item to content item. FIG. 6 illustrates an ordered list 600 of segments to be retrieved and stored in the buffer of the user device, based on the determining priorities of the segments. In this context, S_i_j denotes the j-th segment of the i-th content item. For instance, S_0_5 is the 5th segment of currently playing content item, while S_1_2 represents the 2nd segment of the first video in the queue. To minimize the start-up delay, the first segment of a content item must be buffered before the user scrolls to the content item. For continuous playback without re-buffering or stall, a segment must arrive or be buffered prior to its start of play. If it is not, re-buffering or stalling can occur. Re-buffering delay can be estimated for each of the segments that are to be delivered. This delay depends on the relationship between the time that the segment's play starts, t_play_i_j, and the time that the segment is finished buffering, t_buffered_i_j. If the play starts before the buffering of segment S_i_j is finished (e.g., t_play_i_j<t_buffered_i_j), re-buffering occurs and therefore the playback stalls. This applies to the start-up delay as well. If t_play_i_0<t_buffered_i_0, the i-th content item cannot start playing and the user experiences a delay when scrolling to this content item.

The point in time that segment S_i_j is finished buffering can be estimated based on the estimated bandwidth. The actual start time of a segment may depend on the user's scrolling behavior and patterns. However, the order of segments' start times may be predictable based on their order in the playback timeline. For instance, t_play_i_j<t_play_i_(j+1), and t_play_i_0<t_play_(i+1)_0. In some embodiments, the expected start time of a segment can be estimated to cover a range with varying probabilities. For instance, assuming a scenario that the user constantly scrolls to the next content item after each content item plays for only 1 second, the application may estimate the start time for the first segment of each video, t_play_i_0. In this case, the numbers of t_play_i_j for j>0 are no longer applicable since those segments are not to be played. Alternatively, in an example where a user constantly finishes each content item before scrolling to the next, the start time of each segment S_i_j can be estimated accordingly considering the run time of each content item. This may provide a less challenging situation in buffering the segments, assuming all that is required for playback are the segments in a sequential order. In other words, all the segments are due as late as possible, and the bottleneck is the network bandwidth available to deliver all the segments.

In practice, a user scrolls to a next content item or video at different points on a timeline when viewing video clips, as illustrated in FIG. 5. The estimation of expected play time can leverage the statistics of the average user's interaction with short form content items, including the statistics of content (e.g., the consumption of segments among a large number of users). Additionally, the user's personal behavior and patterns observed over time can be used to derive the expected play time for a given segment. There may be a range of start times for each segment, including the worst-case and the best-case scenarios. If there is a high probability for a segment that t_play_i_j<t_buffered_i_j, the segment can be prioritized in the delivery.

The application may then apply preferential buffering priority to one or more segments, based on the determining priority levels for the segments. FIG. 6 illustrates an example of a sequence of segments that are to be delivered to the user device. The sequence 600 is a representation of what may be in the outgoing buffer of a server. Those segments are a collection of segments from the currently playing content item as well as the content items in the queue. As can be seen, the segments are ordered based on priority, such that segment S_5_1 is scheduled for retrieval before segment S_1_3.

In addition to the functions noted above (e.g., prioritizing segments based on a user's past behavior), in some embodiments the application may account for changes in user behavior. When the user's actual behavior deviates from the predictions, it may create a more urgent scenario with respect to segment buffering priorities. For example, some users may reach the end of each content item recommended to them, and the application may predict that this user will continue to do so, optimizing the priority and order of segments to be retrieved for videos in the queue accordingly. When the user suddenly skips from a first content item to a second content item at the very beginning of the display of the first content item, the application may automatically determine that it should apply preferential buffering priority to the segments of the second content item, and potentially one or more segments of subsequent content items, due to the difference between the user's actual behavior and expected behavior. In another embodiment, in cases where L4S or other preferential buffering priority techniques are available, the application may factor in the availability of these preferential buffering priority techniques downstream. That is, the application may more heavily weigh the predictions of bandwidth and user behavior when optimizing the pre-buffering order, because the application has the ability to automatically apply L4S or other preferential buffering priority techniques when the user's actual behavior deviates from the predictions.

Figure 7:
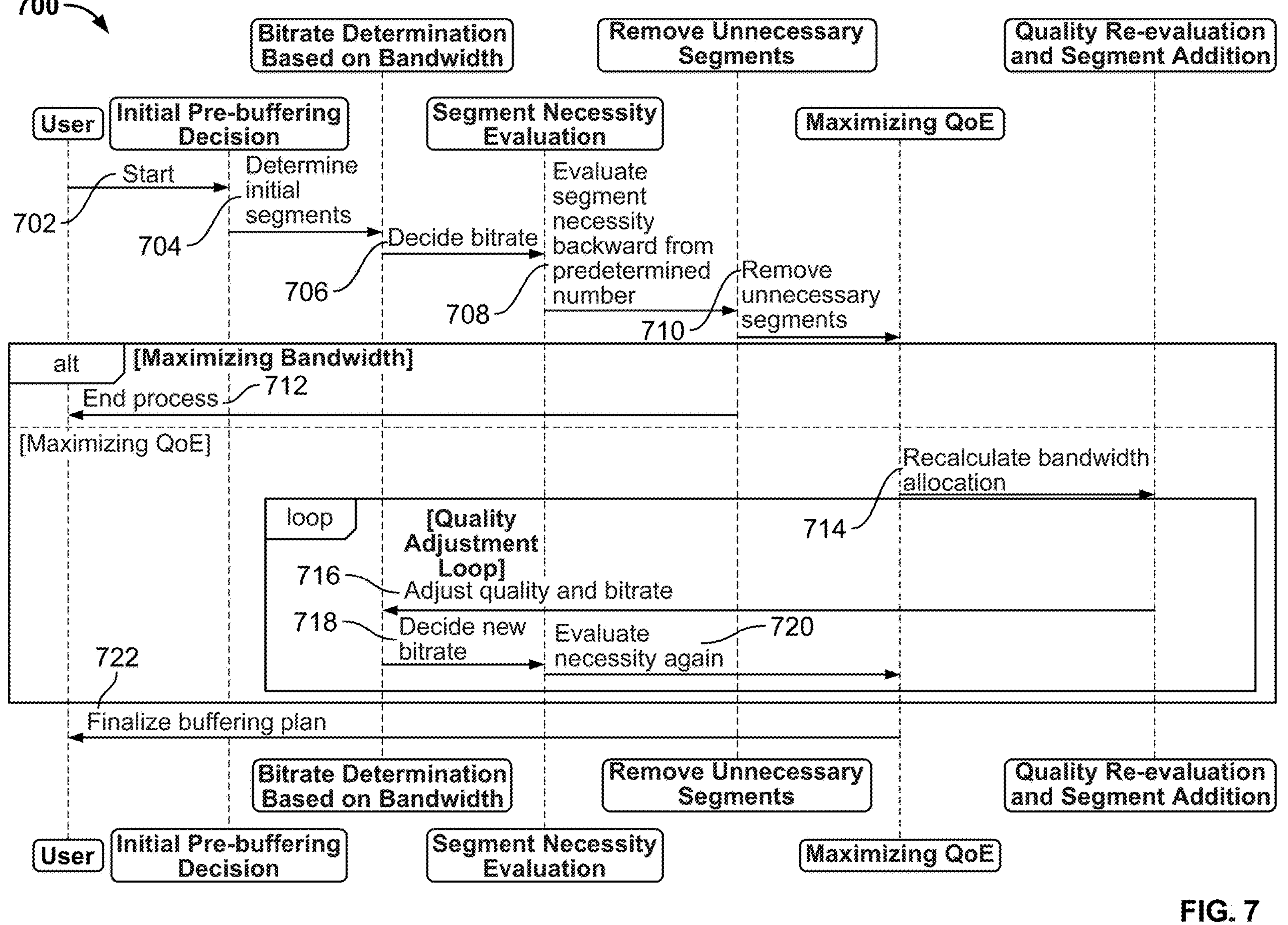
FIG. 7 illustrates an example sequence diagram showing how the set of segments to be buffered may be determined, in accordance with some embodiments of this disclosure.

FIG. 7 illustrates a sequence diagram showing portions of the methods described herein, for determining which segments should be included in the list of segments to be pre-buffered at the user device. At step 702, the user device initiates the process. This may include the user accessing or opening the application in which the user device provides content items. Alternatively, this may include the user refreshing the application, or scrolling to a next content item to restart the process of buffering and/or pre-buffering content item segments.

At step 704, the process 700 includes the application determining the recommended set of segments to be buffered from the current content item and the content items in the queue. As noted above, this may include the application using any suitable algorithm or recommendation technique for identifying the set of content items, as well as the corresponding recommended segments of those content item.

At step 706, the process 700 includes the application determining the bitrate for each of the initial segments. This may include the application determining the available bandwidth for the user device, determining the available bitrates for the segments of the content items, and then determining the bitrate at which to request each segment based on the available bandwidth and available bitrates of the segments.

At step 708, the process 700 includes the application evaluating each segment to determine whether it should be buffered or pre-buffered, or whether it can be removed or left of the list of segments to be buffered or pre-buffered. This evaluation is described in detail above, and may include determining, for each of the segments, the global retention rate, the quality level, the user-specific retention rate, and more. Based on the segment information, network information, user information, and/or other factor described herein, the application may make a decision on a segment by segment basis whether each segment should be included in the list of segments to be buffered or pre-buffered. Further, as noted above, this step can be understood in at least two different ways. In a first embodiment, as illustrated in FIG. 7, the application determines the initial set of segments at step 704 that includes both the required segments and the optional segments, and then at step 710 the application removes one or more of the optional segments from the initial set of segments based on the evaluations at step 708. In another embodiment, the application determines the initial set of segments to include the required segments and the optional segments, but includes only the required segments in the list of segments to be buffered or pre-buffer. Then at step 708 the application evaluates each optional segment to determine if that optional segment should be added to the set of segments to be buffered or pre-buffered. In either case, the application arrives at a modified set of segments to be buffered or pre-buffered that includes fewer segments than the initial set of segments determined at step 704.

Furthermore, as illustrated in FIG. 7, in some embodiments the evaluation of segments may be performed in an order beginning with the last optional segment, and moving toward the first segment for each video. That is, if there are 4 optional segments (e.g., segments 1_3, 1_4, 1_5, and 1_6), the application may analyze segment 1_6 to determine whether it should be included in the set of segments to be buffered or pre-buffered, and then analyze segment 1_5, and 1_4, etc. In this way, the analysis occurs with respect to the last segments first, enabling these segments to be removed early on in the process, leading to a more efficient overall analysis.

At step 712, if the goal is determined to be simply to reduce wastage, the process 700 may end. In this context, ending the process may refer to proceeding back to the beginning of the process to repeat steps 702-712 when a user action or other trigger occurs (e.g., user finishes a video), causing the application to reevaluate a new or updated set of segments. The application may continue to operate by buffering and pre-buffering the segments, and then presenting those segments via the user device.

Alternatively, the process 700 may continue at step 714. At step 714, the application recalculates the bandwidth allocation for the user device based on the modified set of segments. That is, because the application has removed (or determined not to add) one or more optional segments, the bandwidth allocated for those segments is no longer needed. The application can reallocate that excess bandwidth to one or more other segments using the loop of process steps 716-720. At step 716, the application adjusts the quality and bitrate, at step 718 the application decides on a new bitrate for a given segment, and at step 720 the application reevaluates the segment at the updated bitrate. The loop of steps 716-720 may continue as the previously removed (or not added) segments from steps 708-710 are updated with new bitrates, reevaluated using the updated bitrates, and then optionally added back to the set of segments to be buffered based on the updated evaluation. In this manner, the application may arrive at an optimal set of segments to be buffered, wherein one or more of the segments may have different bitrates, all while remaining at or below the initial bandwidth allocation for the user device. Put another way, the application may determine an initial set of 20 segments to be buffered at step 704 and at step 710 the initial set may be reduced to 12 segments. Based on the modified set of 12 segments, the application may determine that there is substantial bandwidth that was initially allocated for the 8 removed segments that may now be reallocated. The application may then allocate more bandwidth to a subset of the 8 removed segments (e.g., the next segment in each of the first four content items in the queue that were removed based on the evaluation at step 708). Based on this increased bandwidth, these previously removed segments may be allocated a higher bitrate, and thus a higher quality level. And based on the higher quality level, the user-specific retention rate for each of these segments may increase above the retention threshold. And then as a result, the reevaluation at step 720 of these four previously removed segments may instead determine that they should be included in the set of segments to be buffered or pre-buffered, albeit at the new higher bitrate that they were allocated at steps 716 and 718. This loop may continue until the application arrives at an optimal solution. In this case, the initial set of segments included 20 segments, was reduced to 12 segments based on the initial evaluation, and was then increased to 16 segments after the application reevaluated the segments.

At step 722, after the application arrives at a final set of segments to be buffered or pre-buffered, the buffering plan is executed such that the user device retrieves and stores the segments in the user device buffer. Alternatively, in some embodiments, the process 700 may include an additional step of determining the priority level for each of the segments (e.g., as described above with respect to FIGS. 4-6). The application may then rearrange the order of the segments based on the priorities, so as to further minimize or remove start-up delay, re-buffering, and other issues noted herein.

Figure 8:
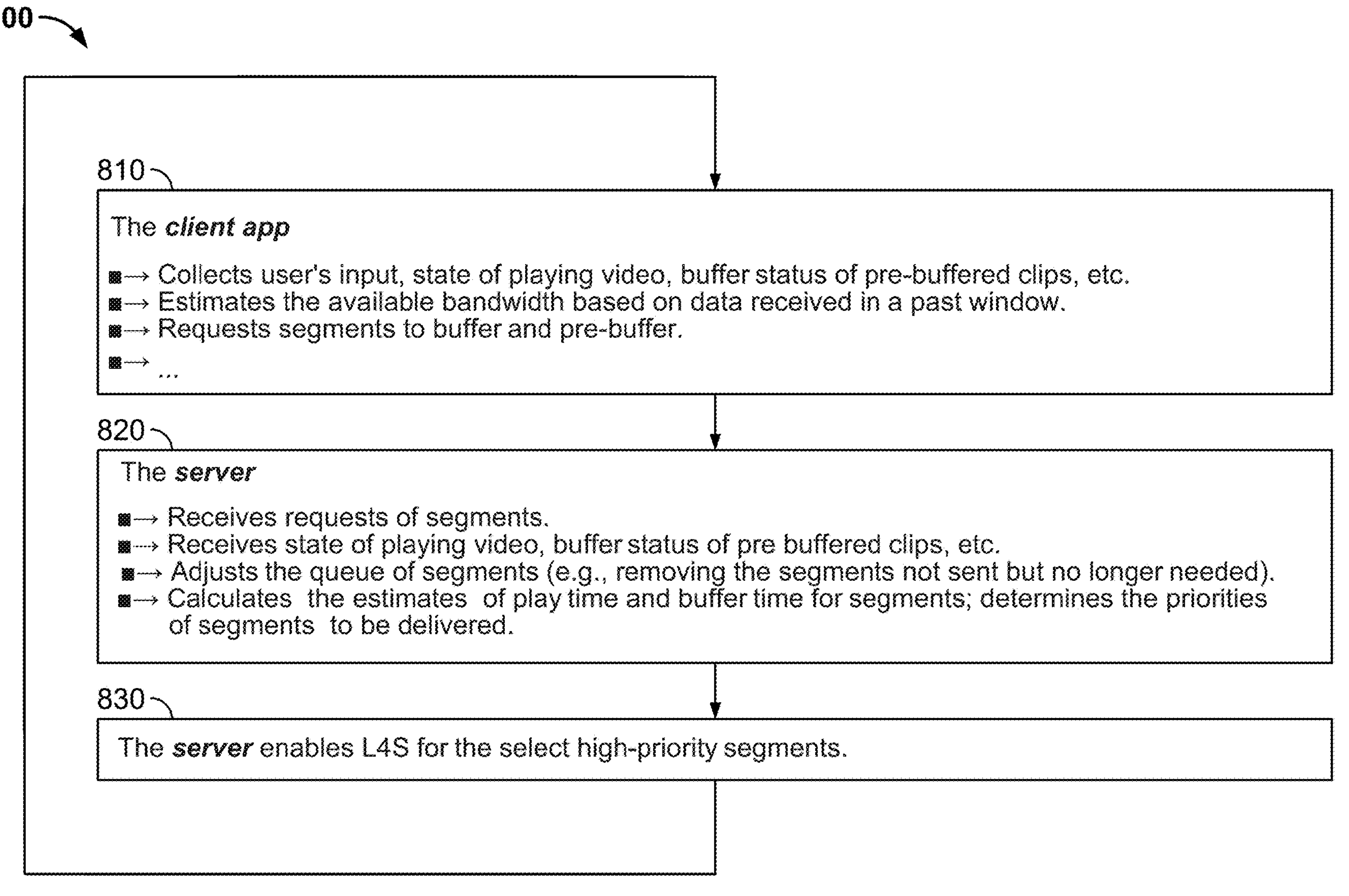
FIG. 8 illustrates an example diagram showing how a user device and one or more servers may operate, in accordance with some embodiments of the disclosure.

FIG. 8 illustrates a simplified flowchart of an embodiment wherein the functions described herein are carried out in part by the user device and in part by one or more servers that provide the segments of the content items. Embodiments described herein may refer to various functions or actions being performed by the application. It should be appreciated that the application may be split between the user device and one or more servers, such that some functions may be performed by the application on the user device, and some functions may be performed by the application on the one or more servers providing the segments of the content items.

The process 800 includes step 810, which includes the user device (and/or the application running on the user device) performing one or more functions. These functions may include collecting user input and user behavior over time, determining the current state of play of a content item, determining the status of buffered or pre-buffered segments, and more. The user device may also determine the available bandwidth, and may request segments to buffer or pre-buffer.

The one or more servers at step 820 may be running the application or a portion of the application. The one or more servers may be configured to receive the requests for segments from the user device, receive the state of the currently playing content item, the status of the buffered or pre-buffered segments, and any other data determined by the user device. The one or more servers may also be configured to adjust the queue of segments to be sent to the user device, such as by removing or adding one or more segments. The one or more servers may also be configured to calculate the expected play time, expected buffer time, and determine the priority levels for one or more segments. Further, at step 840, the one or more serves may be configured to enable the preferential buffering priority for one or more segments (e.g., enabling L4S). In the example of FIG. 8, the calculation of estimates of the expected lay time and expected buffer time for each segment may be executed at the one or more servers, because the one or more servers may have better knowledge of the queued segments that are to be delivered. The one or more servers may also timely adjust the queue by removing segments that are no longer required if the user scrolls away from an earlier segment of the same video.

It should be understood that one or more functions or actions described herein may be performed continuously, at regular or irregular intervals, or successively in order to accommodate user actions. For example, as the user scrolls through the queue of content items, the queue may be updated, and the processes described herein (e.g., process 700) may be executed again each time the queue is updated. Additionally, the estimates of the expected play time and expected buffer time for one or more segments may be updated as the session progresses. In other words, at any time instance, a scroll to the next content item or continuing with the current content item can lead to varying priorities of the segments that are requested.

Figure 9A:
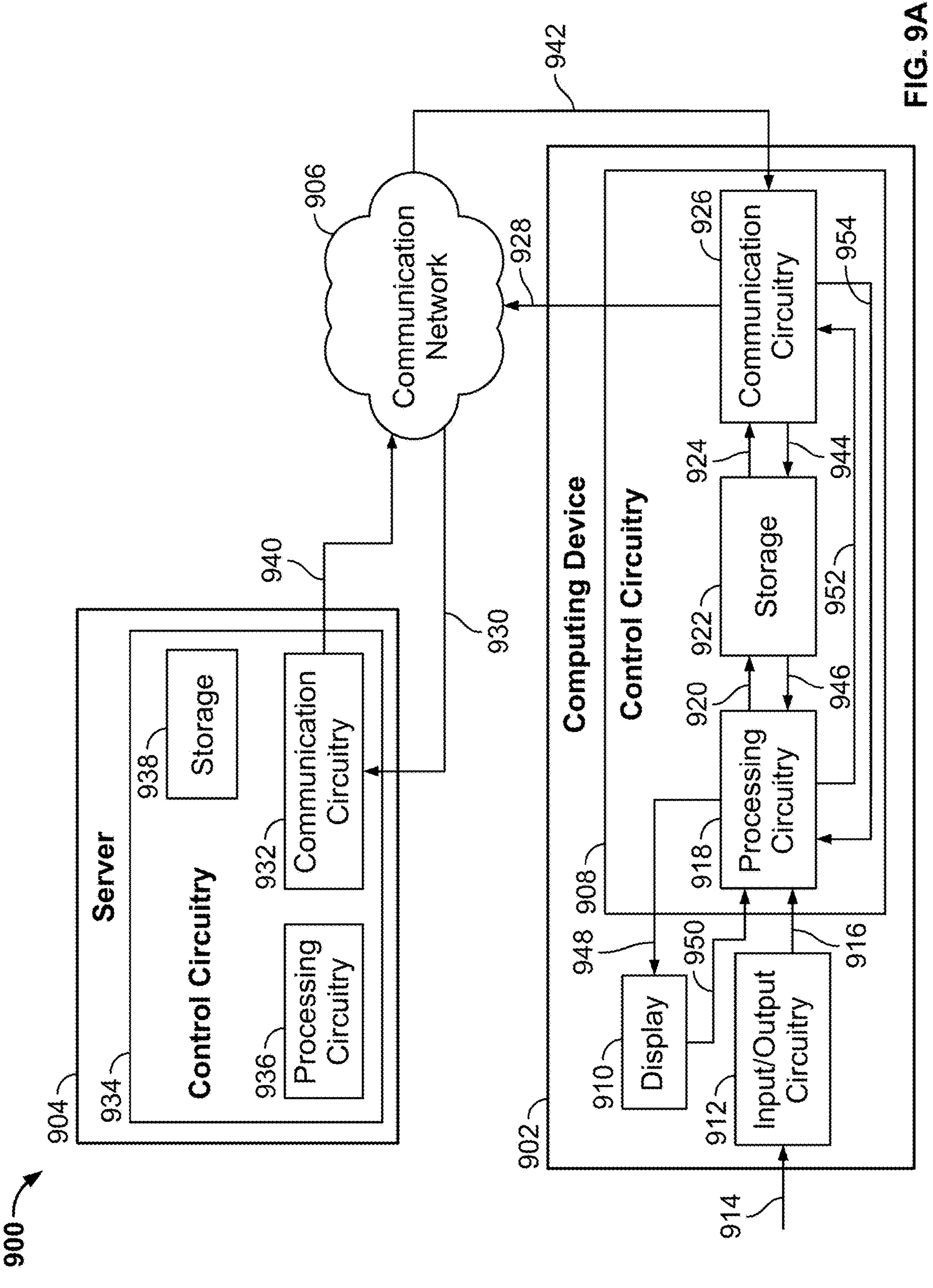
FIG. 9A depicts a system for carrying out various functions described herein, in accordance with some embodiments of the disclosure.

FIG. 9A depicts system 900 according to various embodiments of this disclosure. System 900 may be configured to execute the application described above and below with respect to FIGS. 1-8 and 10, and may include various implementations of processing circuitry across one or more devices to execute any or all of, in whole or in part, the methods and functions depicted in and described elsewhere in this disclosure. System 900 is shown to include a computing device 902, a server 904 and a communication network 906. It is understood that while a single instance of a component may be shown and described relative to FIG. 9, additional instances of the component may be employed. For example, server 904 may include, or may be incorporated in, more than one server. Similarly, communication network 906 may include, or may be incorporated in, more than one communication network. Server 904 is shown communicatively coupled to computing device 902 through communication network 906. While not shown in FIG. 2, server 904 may be directly communicatively coupled to computing device 902, for example, in a system absent or bypassing communication network 906.

Communication network 906 may comprise one or more network systems, such as, without limitation, an internet, LAN, WIFI or other network systems suitable for audio processing applications. In some embodiments, system 900 excludes server 904, and functionality that would otherwise be implemented by server 904 is instead implemented by other components of system 900, such as one or more components of communication network 906. In still other embodiments, server 904 works in conjunction with one or more components of communication network 906 to implement certain functionality described herein in a distributed or cooperative manner. Similarly, in some embodiments, system 900 excludes computing device 902, and functionality that would otherwise be implemented by computing device 902 is instead implemented by other components of system 900, such as one or more components of communication network 906 or server 904 or a combination. In still other embodiments, computing device 902 works in conjunction with one or more components of communication network 906 or server 904 to implement certain functionality described herein in a distributed or cooperative manner.

Computing device 902 includes control circuitry 908, display 910 and input circuitry 912. Control circuitry 908 in turn includes communication circuitry 926, storage 922 and processing circuitry 918. In some embodiments, computing device 902 or control circuitry 908 may be configured as computing device 902 of FIG. 9B.

Server 904 includes control circuitry 934 and storage 938. Each of storages 922 and 938 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 922, 938 may be used to store various types of content, metadata, segments of content items, user behavior, and or other types of data. Non-volatile memory may also be used (e.g., to launch a boot-up routine and other instructions). Cloud-based storage may be used to supplement storages 922, 938 or instead of storages 922, 938. In some embodiments, data characterized through a user device, a profile affiliated with a user device, or data retrievable and transmittable to a generative AI engine, and data relating to all other processes and features described herein, may be recorded and stored in one or more of storages 922, 938.

In some embodiments, control circuitry 934 and/or 908 executes instructions for an application stored in memory (e.g., storage 938 and/or storage 922). Specifically, control circuitry 934 and/or 908 may be instructed by the application to perform the functions discussed herein. In some implementations, any action performed by control circuitry 934 and/or 908 may be based on instructions received from the application. For example, the application may be implemented as software or a set of executable instructions that may be stored in storage 938 and/or 922 and executed by control circuitry 934 and/or 908. In some embodiments, the application may be a client/server application where only a client application resides on computing device 902, and a server application resides on server 904.

The application may be implemented using any suitable architecture. For example, it may be a stand-alone application wholly implemented on computing device 902. In such an approach, instructions for the application are stored locally (e.g., in storage 922), and data for use by the application is downloaded on a periodic basis (e.g., from an out-of-band feed, from an internet resource, or using another suitable approach). Control circuitry 908 may retrieve instructions for the application from storage 922 and process the instructions to perform the functionality described herein. Based on the processed instructions, control circuitry 908 may determine a type of action to perform in response to input received from input circuitry 912 or from communication network 906.

In client/server-based embodiments, control circuitry 908 may include communication circuitry suitable for communicating with an application server (e.g., server 904) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 906). In another example of a client/server-based application, control circuitry 908 runs a web browser that interprets web pages provided by a remote server (e.g., server 904). For example, the remote server may store the instructions for the application in a storage device. The remote server may process the stored instructions using circuitry (e.g., control circuitry 908) and/or generate displays. Computing device 902 may receive the displays generated by the remote server and may display the content of the displays locally via display 910. This way, the processing of the instructions is performed remotely (e.g., by server 904) while the resulting displays, such as the display windows described elsewhere herein, are provided locally on computing device 902. Computing device 902 may receive inputs from the user via input circuitry 912 and transmit those inputs to the remote server for processing and generating the corresponding displays. Alternatively, computing device 902 may receive inputs from the user via input circuitry 912 and process and display the received inputs locally, by control circuitry 908 and display 910, respectively.

Server 904 and computing device 902 may transmit and receive content and data such as segments, user data, and input from primary devices and secondary devices, such as speakers, LED displays or arrangements, monitors of smart home devices or audio-video device, or one or more of AR or XR devices. Control circuitry 934, 908 may send and receive commands, requests, and other suitable data through communication network 906. Control circuitry 934, 908 may communicate directly with each other using communication circuitry 926 and 932, respectively, avoiding communication network 906.

It is understood that computing device 902 is not limited to the embodiments and methods shown and described herein. In nonlimiting examples, computing device 902 may be a virtual, augmented, or mixed reality headset, smart glasses, or a device that can perform functions in the metaverse, a primary device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably displaying content items.

Control circuitry 934 and/or 908 may be based on any suitable processing circuitry such as processing circuitry 918 and/or 936, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 934 and/or control circuitry 908 are configured to render one or more elements of supplemental content corresponding to a selectable product icon described throughout this disclosure (e.g., audio content, visible content, XR immersive content).

User input 904 may be received from virtual, augmented, or mixed reality headsets, mobile data, smart glasses. Transmission of user input 904 to computing device 902 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, 5G, or any other suitable wireless transmission protocol. Input circuitry 912 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, 5G, or other wireless transmission protocols.

Processing circuitry 918 may receive input 904 from input circuit 912. Processing circuitry 918 may convert or translate the received user input 904 that may be in the form of voice input into a microphone, or movement or gestures to digital signals. In some embodiments, input circuit 912 performs the translation to digital signals. In some embodiments, processing circuitry 918 (or processing circuitry 936, as the case may be) carries out disclosed processes and methods.

Figure 9B:
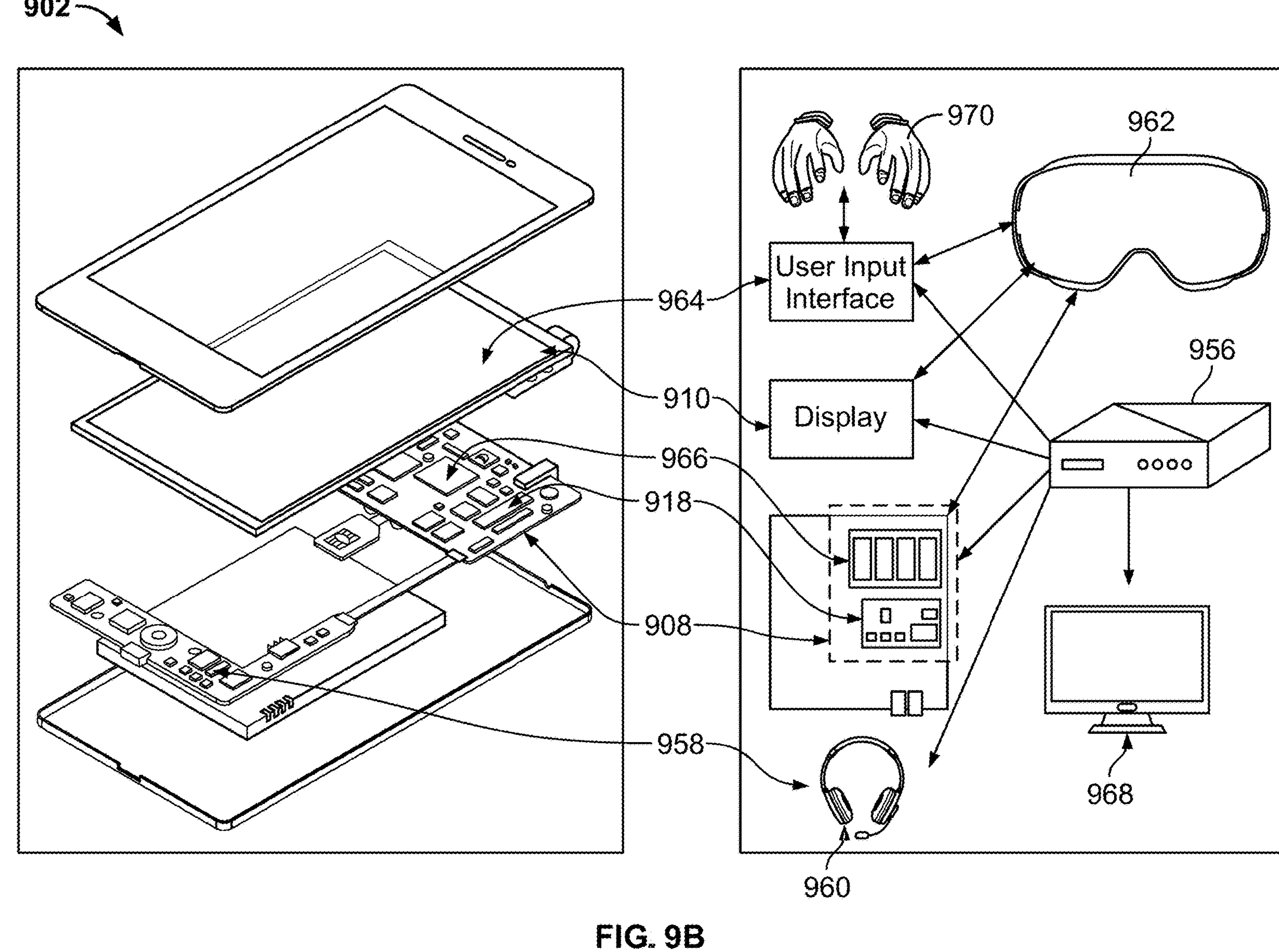
FIG. 9B depicts computing device of the system shown in FIG. 9A, in accordance with some embodiments of the disclosure.

FIG. 9B depicts computing device 902 of system 900, in accordance with some embodiments of the disclosure. Computing device 902 may be configured to execute one or more functions described herein.

Computing device 902 may be a smartphone device, a tablet, a virtual reality or augmented reality device, or any other suitable device capable of processing data corresponding to an e-commerce application and related supplemental content described in this disclosure. In another example, a user equipment device, such as a user television equipment system or streaming interface device, may include media access device 956. Media access device 956 may be communicatively connected to haptic enabled headset 958, audio input equipment (e.g., headset microphone 960), and display 910. In some embodiments, display 910 may be a television display or a computer display. In some embodiments, display 910 may be a display in an HMD or an XR device. As shown in FIG. 9B, display 910 may be communicatively coupled to or may comprise head mounted display 962, which also is shown in FIG. 9B as being communicatively coupled to one or more of user input interface 964 (e.g., may display user input interface 964 with capabilities to receive user inputs via input/output circuitry 912 of FIG. 9A) or haptic feedback hand devices 970 (e.g., configured to enable a user to provide inputs to user input interface 968 or display 910 as the user would by a remote or a communicatively coupled computer mouse or joystick), while also being communicatively coupled to media access device 956. In some embodiments, user input interface 968 may be a remote-control device. Media access device 956 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Computing device 902 may receive content and data via input/output (I/O) path (e.g., circuitry) 966, which may communicatively interface with head mounted display 962. I/O path 966 may provide content (e.g., broadcast programming, on-demand programming, Internet content, content available over a local area network (LAN) or wide area network (WAN), and/or other content) and data to control circuitry 908, which may comprise processing circuitry 918 and storage 922 of FIG. 9A. Control circuitry 908 may be used to send and receive commands, requests, and other suitable data using I/O path 966, which may comprise I/O circuitry. I/O path 966 may connect control circuitry 908 (and specifically processing circuitry 918) to one or more communications paths (described below). I/O functions may be provided by one or more of these communications paths, but are shown as a single path in FIG. 9B to avoid overcomplicating the drawing. While media access device 956 is shown in FIG. 9B for illustration, any suitable computing device having processing circuitry, control circuitry, and storage may be used in accordance with the present disclosure. For example, media access device 956 may be replaced by, or complemented by, a personal computer (e.g., a notebook, a laptop, a desktop), a smartphone (e.g., device 902), a tablet, a network-based server hosting a user-accessible client device, a non-user-owned device, any other suitable device, or any combination thereof.

Control circuitry 908 may be based on any suitable control circuitry such as processing circuitry 918. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 908 executes instructions for the video application stored in memory (e.g., storage 922 or 938 of FIG. 9A). Specifically, control circuitry 908 may be instructed by the video application to perform the functions discussed above and below. In some implementations, processing or actions performed by control circuitry 908 may be based on instructions received from the video application.

In client/server-based embodiments, control circuitry 908 may include communications circuitry suitable for communicating with a server or other networks or servers. The video application described herein may be a stand-alone application implemented on a device or a server. The video application may be implemented as software or a set of executable instructions. The instructions for performing any of the embodiments discussed herein of the video application may be encoded on non-transitory computer-readable media (e.g., a hard drive, random-access memory on a DRAM integrated circuit, read-only memory on a BLU-RAY disk, etc.). For example, in FIG. 9B, the instructions may be executed by control circuitry 908 of computing device 902 while being stored via one or more processors shown in FIG. 9A.

In some embodiments, the video application may be a client/server application where a portion of the application resides on computing device 902, and a portion of the application resides on an external server (e.g., server 904 of FIG. 9A). For example, the video application may be implemented partially as a client application on control circuitry 908 of computing device 902 and partially on server 904 as a server application running on control circuitry 934. Server 904 may be a part of a local area network with one or more computing devices 902 or may be part of a cloud computing environment accessed via the internet. In a cloud computing environment, various types of computing services for performing searches on the internet or informational databases, providing seamless virtual space traversing capabilities, providing storage (e.g., for a database) or parsing data (e.g., using machine learning algorithms) are provided by a collection of network-accessible computing and storage resources (e.g., server 904 and multiples of computing device 902), referred to as "the cloud." Computing device 902 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904, the video application may instruct control circuitry 934 or 908 to perform processing tasks for the client device and facilitate the seamless virtual space traversing.

Control circuitry 908 may include communications circuitry suitable for communicating with a server, edge computing systems and devices, a table or database server, or other networks or servers. The instructions for carrying out the above mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device that is part of control circuitry 908. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage may be used to store various types of content described herein as well as application data described above. Non-volatile memory may also be used (e.g., to launch a boot-up routine and other instructions). Cloud-based storage may also be used to supplement storage 938 of FIG. 9A or instead of storage 922.

Control circuitry 908 may include video generating circuitry and tuning circuitry, such as one or more analog tuners, one or more video decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 908 may also include scaler circuitry for up converting and down converting content into the preferred output format of computing device 902. Control circuitry 908 may also include digital-to-analog converter circuitry and analog-to-digital converter circuitry for converting between digital and analog signals. The tuning and encoding circuitry may be used by computing device 902 to receive and to display, to play, or to record content. The tuning and encoding circuitry may also be used to receive video data for seamless interspace traversing. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage is provided as a separate device from computing device 902, the tuning and encoding circuitry (including multiple tuners) may be associated with the storage.

Control circuitry 908 may receive instruction from a user by way of user input interface 964. User input interface 964 may be any suitable user interface, such as a remote control, mouse, trackball, keypad, keyboard, touch screen, touchpad, stylus input, joystick, voice recognition interface, or other user input interfaces (e.g., an interface configured to receive inputs from haptic feedback hand devices 970). Display 910 may be provided as a stand-alone device or integrated with other elements of each one of computing device 902. For example, display 910 may be a touchscreen or touch-sensitive display. In such circumstances, user input interface 964 may be integrated with or combined with display 910 (e.g., where haptic feedback hand devices 970 is configured to enable a user to interact with or manipulate aspects of a media asset interface displayed via head mounted display 962). In some embodiments, user input interface 964 includes a remote-control device having one or more microphones, buttons, keypads, and any other components configured to receive user input or combinations thereof. For example, user input interface 964 may include a handheld remote-control device having an alphanumeric keypad and option buttons (e.g., haptic feedback hand devices 970). In a further example, user input interface 964 may include a handheld remote-control device having a microphone and control circuitry configured to receive and identify voice commands and transmit information to media access device 956.

Headset microphone 960 may be integrated with or combined with display 910. Display 910 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 910. Headset microphone 960 may be provided as integrated with other elements of each one of computing device 902 or may be stand-alone units. An audio component of videos and other content displayed on display 910 may be played through speakers (or headphones) of haptic enabled headset 958. In some embodiments, audio may be distributed to a receiver (not shown), which processes and outputs the audio via speakers of haptic enabled headset 958. In some embodiments, for example, control circuitry 908 is configured to provide audio cues to a user, or other audio feedback to a user, using speakers of haptic enabled headset 958. There may be a separate haptic enabled headset 958 or headset microphone 960 may include a microphone configured to receive audio input such as voice commands or speech. For example, a user may speak letters or words that are received by the microphone and converted to text by control circuitry 908. In a further example, a user may voice commands that are received by a microphone and recognized by control circuitry 908. Recording device 968 may be any suitable video camera integrated with the equipment or externally connected. Recording device 968 may be a digital camera comprising a charge-coupled device (CCD) and/or a complementary metal-oxide semiconductor (CMOS) image sensor. Recording device 968 may be an analog camera that converts to digital images via a video card.

The application configured to perform the functions described herein may be implemented using any suitable architecture. For example, it may be a stand-alone application wholly implemented on each one of computing device 902. In such an approach, instructions of the application may be stored locally, and data for use by the application is downloaded on a periodic basis (e.g., from an out-of-band feed, from an Internet resource, or using another suitable approach). Control circuitry 908 may retrieve instructions of the application from storage and process the instructions to provide seamless interspace traversing functionality and perform any of the actions discussed herein. Based on the processed instructions, control circuitry 908 may determine what action to perform when input is received from user input interface 964. For example, movement of a cursor on a display up/down may be indicated by the processed instructions when user input interface 964 indicates that an up/down button was selected (e.g., based on inputs provided via haptic feedback hand devices 970). An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of computing device 902 and may be retrieved on-demand by issuing requests to a server remote to each one of computing device 902. For example, the remote server may store the instructions for the application in a storage device. The remote server may process the stored instructions using circuitry (e.g., control circuitry 908) and generate the displays discussed above and below. The client device may receive the displays generated by the remote server and may display the content of the displays locally on computing device 902. This way, the processing of the instructions is performed remotely by the server while the resulting displays (e.g., that may include text, a keyboard, or other visuals) are provided locally on computing device 902. Computing device 902 may receive inputs from the user via input interface 964 and transmit those inputs to the remote server for processing and generating the corresponding displays. For example, computing device 902 may transmit a communication to the remote server indicating that an up/down button was selected via input interface 964 (e.g., based on one or more inputs provided via one or more of haptic feedback hand devices 970 or head mounted display 962). The remote server may process instructions in accordance with that input and generate a display of the application corresponding to the input (e.g., a display that moves a cursor up/down). The generated display is then transmitted to a communicatively accessible device for presentation to the user.

In some embodiments, the video application may be downloaded and interpreted or otherwise run by an interpreter or virtual machine (run by control circuitry 908). In some embodiments, the application may be encoded in the ETV Binary Interchange Format (EBIF), received by control circuitry 908 as part of a suitable feed, and interpreted by a user agent running on control circuitry 908. For example, the application may be an EBIF application. In some embodiments, the application may be defined by a series of JAVA-based files that are received and run by a local virtual machine or other suitable middleware executed by control circuitry 908. In some of such embodiments (e.g., those employing MPEG-2 or other digital media encoding schemes), video application may be, for example, encoded and transmitted in an MPEG-2 object carousel with the MPEG audio and video packets of a program.

Figure 10:
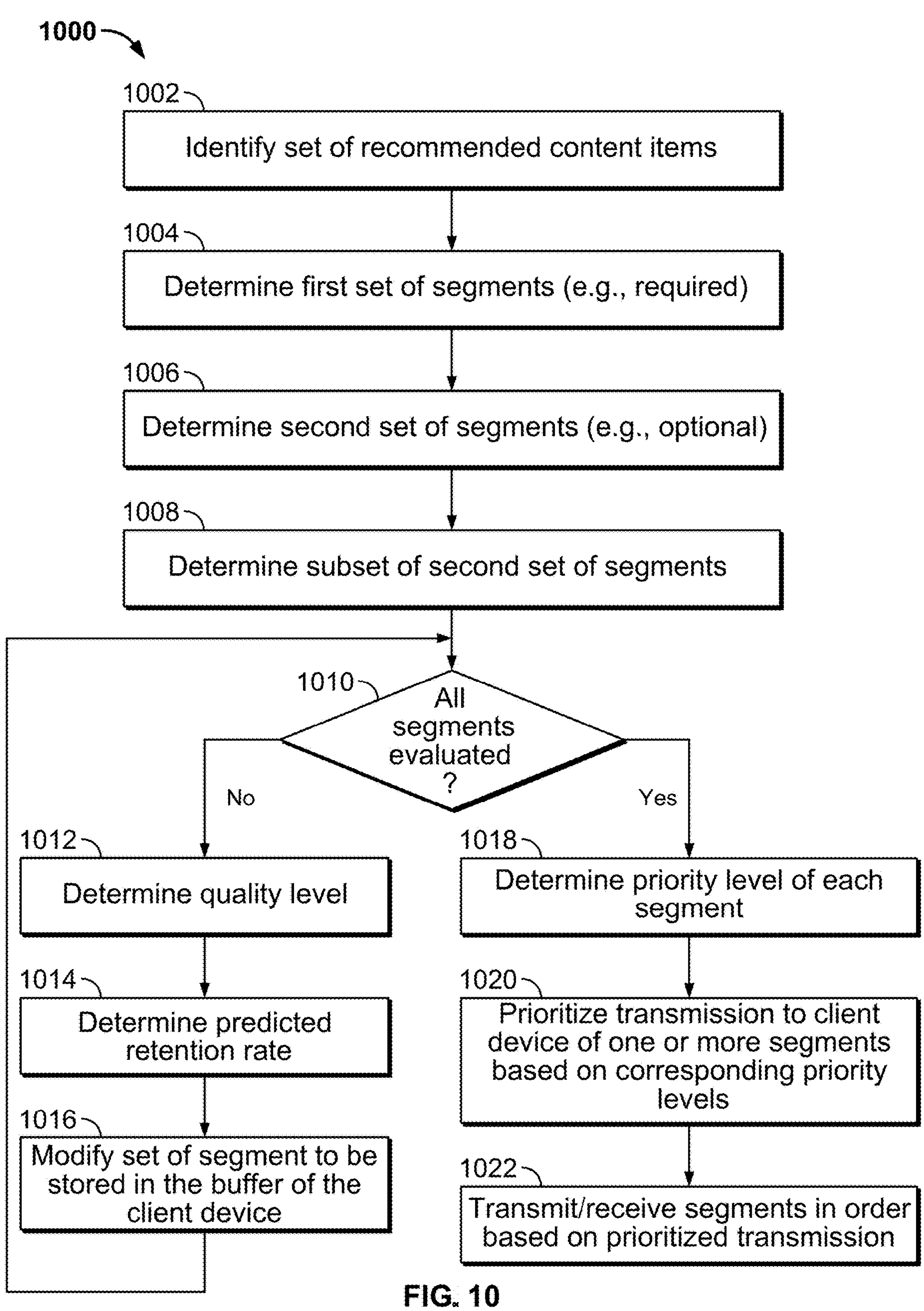
FIG. 10 illustrates an example flowchart showing a process of determining and prioritizing segments to be buffered for a plurality of content items, in accordance with some embodiments of the disclosure.

FIG. 10 is an example flowchart of a process 1000 for managing segments in a short-form video application, in accordance with some examples of the disclosure. The process 1000 may be carried out by the video application described herein, and may be implemented, in whole or in part, by the devices and systems shown in FIGS. 1-9B. One or more actions of the process 1000 may be incorporated into or combined with one or more actions of any other process or embodiments described herein. The process 1000 may be saved to a memory or storage (such as any one or more of those shown in FIGS. 9A-9B) as one or more instructions or routines that may be executed by a corresponding device or system to implement the process 1000.

At step 1002, the application identifies a set of recommended content items. The set of recommended content items may be determined based on the subject matter of the content items, and/or based on a user profile or other information. The set of recommended content items may include a current video, and a queue of recommended videos. The set of recommended videos may be determined using any suitable recommendation algorithm or technique.

At steps 1004 and 1006, the application determines a first set of segments and a second set of segments. Illustratively, the first set of segments may correspond to a set of "required" segments or a minimum number of segments needed to enable playing of the video without start-up delay, and the second set of segments may correspond to a set of "optional" segments. The first set of segments may include segments of the identified set of recommended content items that need to be buffered in order to avoid start-up delay. For example, the first set of segments may include the first three segments of each content item. This is described in further detail with respect to FIGS. 1-2. The second set of segments may include any additional optional segments beyond the set of required segments that the application determines are recommended to be buffered to ensure a high QoE, and/or to avoid re-buffering and other issues.

At step 1008, the application may determine a subset of the second set of segments, wherein the subset comprises segments that are recommended to be pre-buffered, but which are not highly likely to be viewed, and thus are likely to be discarded anyway. The application may determine the subset of the second set of segments by performing the loop of steps 1010-1016. At step 1010, the application determines whether all of the second set of segments have been evaluated. At steps 1012, and 1014, the application determines the quality level of a given segment, and determines a predicted retention rate for that segment. If the predicted retention rate for the segment is above a retention threshold, then the segment is likely to be viewed by the user, and is then included in the list of segments to be buffered or pre-buffered at step 1016. However, if the application determines that the segment has a predicted retention rate that is below the retention threshold, then the segment is not likely to be viewed by the user and is removed or not included in the list of segments to be buffered or prebuffered.

Once all of the second set of segments have been evaluated, the application may determine the priority level of each segment at step 1018. This may include the application determining the priority level of all of the remaining segments on the list of segments to be buffered at the client device. The application may determine the priority level for each segment by determining the expected play time of the segment, and comparing to the expected buffer time of the segment. This process is disclosed in further detail above with respect to FIGS. 4-6. If the expected play time is later than the expected buffer time for a given segment, that indicates that there may be a stall when the client device reaches that segment. As such, the segment may be identified as a high priority segment.

At step 1020, the application may prioritize transmission to the client device of one or more segments based on the corresponding priority levels of the segments. That is, the application may determine that one or more segments have expected buffer times that occur later than the corresponding expected play times, and may determine that retrieval of these segments should be prioritized. The application may use a protocol or technique such as L4S to change the order of retrieval of the segments of the content items, so as to minimize or eliminate start-up delay, re-buffering delay, and other issues.

At step 1020, the application may proceed to request transmission from the content server and receipt at the client device, the segments of the content items, in an order determined based on the respective priority levels. The client device may then present segments of the content items to the user.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention(s) are not restricted to the details of any foregoing embodiments. The invention(s) extend to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method comprising:

identifying a set of recommended content items to be presented on a client device associated with a user, each content item of the set of recommended content items comprising one or more segments;

determining a first set of segments of the set of recommended content items, the first set of segments to be stored in a buffer of the client device;

determining a second set of segments of the set of recommended content items;

determining a subset of the second set of segments by, for each of one or more segments of the second set of segments:

determining a quality level of the segment;

determining, based on the quality level, a predicted retention rate for the segment, wherein the predicted retention rate corresponds to a likelihood that the client device will play the segment; and selecting the segment for the subset of the second set of segments based on a comparison of the predicted retention rate to a retention threshold;

determining a modified set of segments based on the first set of segments and the subset of the second set of segments;

determining, for each segment of the modified set of segments, a priority level; and prioritizing a transmission of one or more segments of the modified set of segments to the client device based on the corresponding priority levels of the one or more segments of the modified set of segments.

2. The method of claim 1, further comprising:

determining an available bandwidth for the client device;

determining the first set of segments based on the available bandwidth; and determining the second set of segments based on the available bandwidth, wherein the determining, for each of the one or more segments of the second set of segments, the quality level of the segment comprises:

determining a bitrate of the segment based on the available bandwidth; and determining the quality level of the segment based on the bitrate of the segment.

3. The method of claim 1, wherein the determining, for each of the one or more segments of the second set of segments, the quality level of the segment comprises determining the quality level of the segment based on (a) a bitrate of the segment and (b) a subject matter related to the segment.

4. The method of claim 1, wherein the determining the predicted retention rate for the segment is based on one or more of (a) a quality level of one or more prior segments of a content item including the segment, (b) an overall retention rate of one or more prior segments of the content item including the segment, or (c) the predicted retention rate for one or more prior segments of the content item including the segment.

5. The method of claim 1, further comprising:
accessing a machine learning model, the machine learning model trained based on historical user data comprising indications of bitrates of a plurality of historical segments and indications of whether the user viewed or skipped the plurality of historical segments; and
determining the predicted retention rate for the segment based on the machine learning model.

6. The method of claim 1, wherein the determining the predicted retention rate for the segment is based on one or more of a segment frame rate, a segment video quality, a segment resolution, or a segment subject matter.

7. The method of claim 1, wherein the determining the predicted retention rate for the segment is based on a position of the segment within a content item including the segment.

8. The method of claim 1, further comprising:
after determining the modified set of segments:
calculating an updated available bandwidth;
determining an updated quality level for each segment of the subset of the second set of segments based on the updated available bandwidth;
determining an updated predicted retention rate for each segment of the second subset of segments; and
adding one or more segments of the subset of the second set of segments to the modified set of segments based on the updated predicted retention rates corresponding to the subset of the second set of segments.

9. The method of claim 1, wherein the determining the priority level for each segment of the modified set of segments comprises, for each segment:
determining an expected play time for the segment, wherein the expected play time corresponds to an expected time at which the segment will begin to be played at the client device;
determining an expected buffer time for the segment, wherein the expected buffer time corresponds to an expected time at which storage of the segment in the buffer of the client device will be complete; and
determining the priority level of the segment based on a comparison of the expected play time and the expected buffer time.

10. The method of claim 9, wherein the expected play time and the expected buffer time for each segment are each determined based on, for that segment, one or more of: (a) a position of the segment within a content item that includes the segment, (b) a number of already buffered segments of the content item that includes the segment, (c) a percentage of the content item that includes the segment that has already been played, (d) a position of the content item including the segment within the set of recommended content items, (e) historical usage data corresponding to the client device, (f) an available bandwidth for the client device, (g) a quality level of the segment, or (h) a bitrate of the segment.

11. A system comprising:
control circuitry configured to:
identify a set of recommended content items to be presented on a client device associated with a user, each content item of the set of recommended content items comprising one or more segments;
determine a first set of segments of the set of recommended content items, the first set of segments to be stored in a buffer of the client device;
determine a second set of segments of the set of recommended content items;
determine a subset of the second set of segments by, for each of one or more segments of the second set of segments:
determining a quality level of the segment;
determining, based on the quality level, a predicted retention rate for the segment, wherein the predicted retention rate corresponds to a likelihood that the client device will play the segment; and
selecting the segment for the subset of the second set of segments based on a comparison of the predicted retention rate to a retention threshold;
determine a modified set of segments based on the first set of segments and the subset of the second set of segments; and
determine, for each segment of the modified set of segments, a priority level; and
input/output circuitry configured to:
prioritize a transmission of one or more segments of the modified set of segments to the client device based on the corresponding priority levels of the one or more segments of the modified set of segments.

12. The system of claim 11, wherein the control circuitry is further configured to:
determine an available bandwidth for the client device;
determine the first set of segments based on the available bandwidth; and
determine the second set of segments based on the available bandwidth,
wherein the determining, for each of the one or more segments of the second set of segments, the quality level of the segment comprises:
determining a bitrate of the segment based on the available bandwidth; and
determining the quality level of the segment based on the bitrate of the segment.

13. The system of claim 11, wherein the control circuitry is further configured to determine, for each of the one or more segments of the second set of segments, the quality level of the segment based on (a) a bitrate of the segment and (b) a subject matter related to the segment.

14. The system of claim 11, wherein the control circuitry is further configured to determine the predicted retention rate for the segment based on one or more of (a) a quality level of one or more prior segments of a content item including the segment, (b) an overall retention rate of one or more prior segments of the content item including the segment, or (c) the predicted retention rate for one or more prior segments of the content item including the segment.

15. The system of claim 11, wherein:
the input/output circuitry is further configured to access a machine learning model, the machine learning model trained based on historical user data comprising indications of bitrates of a plurality of historical segments and indications of whether the user viewed or skipped the plurality of historical segments; and
the control circuitry is further configured to determine the predicted retention rate for the segment based on the machine learning model.

16. The system of claim 11, wherein the control circuitry is further configured to determine the predicted retention rate for the segment based on one or more of a segment frame rate, a segment video quality, a segment resolution, or a segment subject matter.

17. The system of claim 11, wherein the control circuitry is further configured to determine the predicted retention rate for the segment based on a position of the segment within a content item including the segment.

18. The system of claim 11, wherein the control circuitry is further configured to:

after determining the modified set of segments:

calculate an updated available bandwidth;

determine an updated quality level for each segment of the subset of the second set of segments based on the updated available bandwidth;

determine an updated predicted retention rate for each segment of the second subset of segments; and add one or more segments of the subset of the second set of segments to the modified set of segments based on the updated predicted retention rates corresponding to the subset of the second set of segments.

19. The system of claim 11, wherein the control circuitry is further configured to determine the priority level for each segment of the modified set of segments by, for each segment:

determining an expected play time for the segment, wherein the expected play time corresponds to an expected time at which the segment will begin to be played at the client device;

determining an expected buffer time for the segment, wherein the expected buffer time corresponds to an expected time at which storage of the segment in the buffer of the client device will be complete; and determining the priority level of the segment based on a comparison of the expected play time and the expected buffer time.

20. The system of claim 19, wherein the control circuitry is further configured to determine the expected play time and the expected buffer time for each segment based on, for that segment, one or more of: (a) a position of the segment within a content item that includes the segment, (b) a number of already buffered segments of the content item that includes the segment, (c) a percentage of the content item that includes the segment that has already been played, (d) a position of the content item including the segment within the set of recommended content items, (e) historical usage data corresponding to the client device, (f) an available bandwidth for the client device, (g) a quality level of the segment, or (h) a bitrate of the segment.

* * * * *